US010552898B2

(12) United States Patent
Chopra et al.

(10) Patent No.: US 10,552,898 B2
(45) Date of Patent: Feb. 4, 2020

(54) USER TRAINABLE USER INTERFACE PAGE CLASSIFICATION SYSTEM

(71) Applicant: Microsoft Technology Licensing, LLC, Redmond, WA (US)

(72) Inventors: Gagan Chopra, Redmond, WA (US); Anand Sampathkumaran, Redmond, WA (US); Siddharth Banothu, Seattle, WA (US); Zhaoji Chen, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 532 days.

(21) Appl. No.: 15/353,612

(22) Filed: Nov. 16, 2016

(65) Prior Publication Data
US 2018/0137560 A1    May 17, 2018

(51) Int. Cl.
*G06Q 30/00* (2012.01)
*G06Q 30/06* (2012.01)
*G06F 9/451* (2018.01)

(52) U.S. Cl.
CPC ......... *G06Q 30/0643* (2013.01); *G06F 9/451* (2018.02)

(58) Field of Classification Search
CPC ............................................... G06Q 30/06–08
USPC ................................................. 705/26.1–27.2
See application file for complete search history.

(56) References Cited

U.S. PATENT DOCUMENTS

| 6,662,190 | B2 | 12/2003 | Bax et al. |
| 7,925,618 | B2 | 4/2011 | Chen et al. |
| 8,667,015 | B2 | 3/2014 | Jiao et al. |
| 8,958,652 | B1 | 2/2015 | Steves et al. |
| 9,047,614 | B2 | 6/2015 | Kalikivayi et al. |
| 9,098,813 | B1 | 8/2015 | Konig et al. |
| 9,171,088 | B2 | 10/2015 | Thakur et al. |
| 9,336,290 | B1 * | 5/2016 | Truher ................ H04L 67/1085 |
| 2009/0271293 | A1 | 10/2009 | Parkhurst et al. |
| 2013/0311875 | A1 | 11/2013 | Pappas et al. |

FOREIGN PATENT DOCUMENTS

WO      2002035421 A1    5/2002

OTHER PUBLICATIONS

Gandhre, et al., "Creating and managing personal information assistants via a web browser: The WinAgent experience", In Proceedings of Workshop on Information Integration on the Web, Aug. 30, 2004, 9 pages.

(Continued)

*Primary Examiner* — Ethan D Civan
(74) *Attorney, Agent, or Firm* — Holzer Patel Drennan

(57) ABSTRACT

A user trainable user interface page classification system applies a rule set to information associated with a user interface page to determine whether the user interface page satisfies a domain page condition. If the user interface page does not satisfy the domain page condition, a user trains the system such that the user interface page classification system classifies the user interface page as a domain page. The rule set of the user interface page classification system is updated, and the updated rule set is applied to the information associated with the user interface page. The user interface page classification system then classifies the user interface page as a domain page.

20 Claims, 11 Drawing Sheets

(56) References Cited

OTHER PUBLICATIONS

Bing, et al., "Unsupervised Extraction of Popular Product Attributes from E-Commerce Web Sites by Considering Customer Reviews", In Journal of ACM Transactions on Internet Technology, vol. 16 Issue 2, Apr. 2016, 17 pages.

Chopra, Gagan., "User Quest-Anchored Active Digital Memory Assistant", U.S. Appl. No. 15/011,147, filed Jan. 29, 2016, 49 pages.

\* cited by examiner

USER TRAINABLE USER INTERFACE PAGE CLASSIFICATION SYSTEM

CROSS-REFERENCE TO RELATED APPLICATION

This application is related to U.S. patent application Ser. No. 15/011,147, titled, "User Quest-Anchored Active Digital Memory Assistant" and filed Jan. 29, 2016, which is specifically incorporated by reference herein for all that it discloses and teaches.

BACKGROUND

When a user is navigating to a plurality of different webpages, application pages, documents, images, etc. (hereinafter referred to as "user interface pages") that are related based on the user's intent, then the user takes active steps in keeping track of visited user interface pages and information on such user interface pages such as to later recall that information. The related user interface pages may be referred to as "domain pages," and such active steps may include bookmarking user interface pages, printing user interface pages, saving a link to the user interface page, etc. Furthermore, if the information on previously visited user interface pages is updated, the user revisits those user interface pages to observe the updated information.

SUMMARY

In at least one implementation, the described technology provides a user interface page classification system. The user interface page classification applies a rule set to information associated with a user interface page to determine whether the user interface page satisfies a domain page condition. Upon failing to satisfy the domain page condition, the user trains the user interface page classification system. The user interface page classification system receives the user input that indicates the user interface page satisfies the domain page condition. The user interface page classification system updates the rule set based on at least a portion of the information associated with the user interface page. The user interface page classification system applies the updated rule set to the information associated with the user interface page to determine that the user interface page satisfies the domain page condition. The user interface page classification system classifies the user interface page as a domain page responsive to the domain page condition being satisfied.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
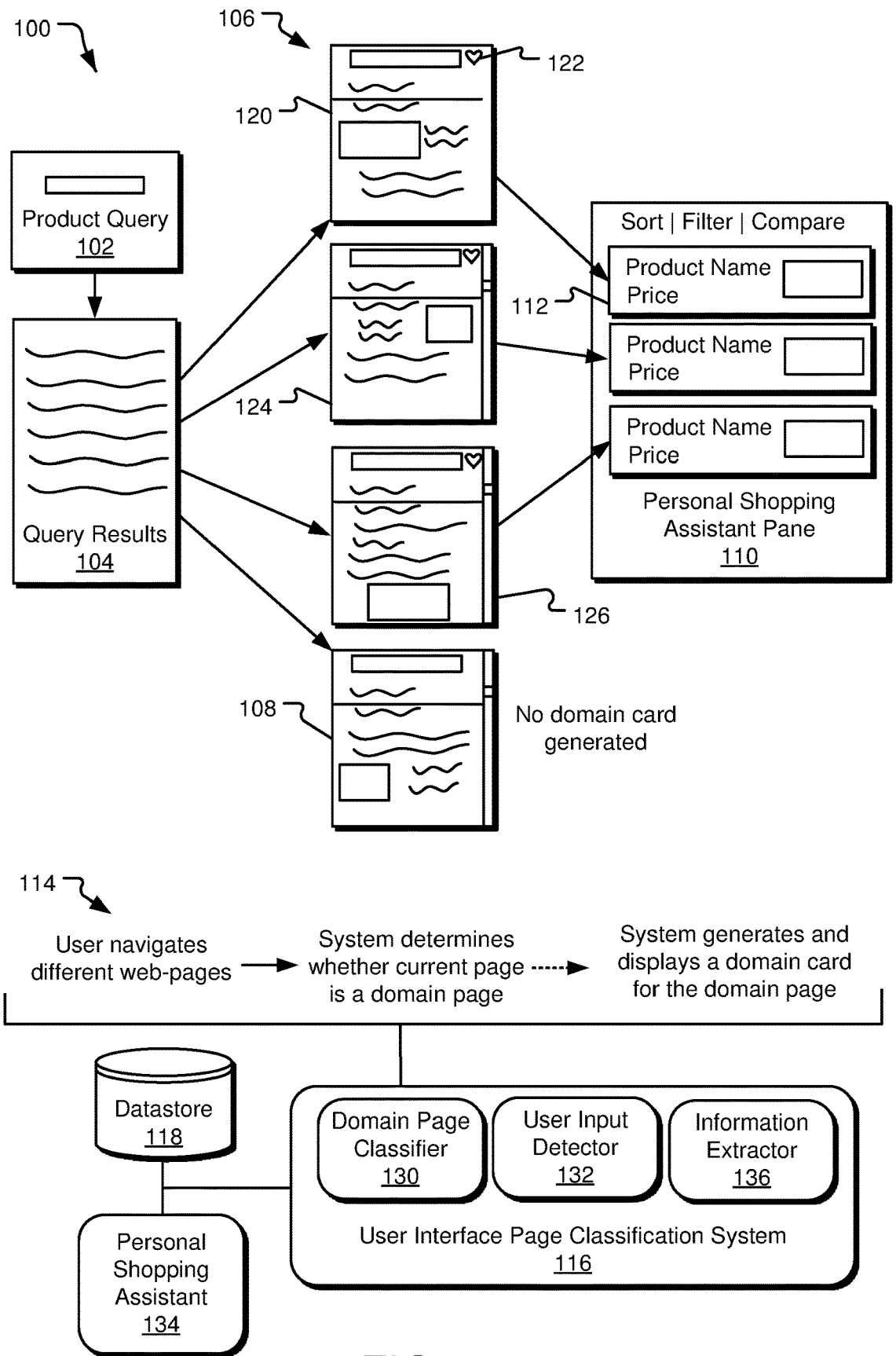
FIG. 1 illustrates a block diagram of an example workflow of a user trainable user interface page classification system disclosed herein.

The implementations described herein provide a user trainable user interface page classification system. The user interface page classification system may be used in association with another application, such as a personal shopping assistant, to classify user interface pages such that information may be extracted from the user interface page for later retrieval by the user. For example, if the user is considering purchasing a particular product, then the user may visit a number of different merchant websites to look at different product pages. The product pages contain useful information such as specifications, price, name, an image of the product etc. The useful information is hereinafter referred to as attributes. As the user continues to browse, he or she may wish to recall a previously visited page to, for example, compare a previously observed product to currently observed product. To recall a previously observed product, the user takes active steps such as by bookmarking the page, printing the page, emailing a link to the page to the user's own email, etc. These methods all require active steps by the user. A personal shopping assistant using the user interface page classification system provided herein may identify a visited webpage as a product page and extract attributes related to the product for later recall by the user. For example, the personal shopping assistant may identify and save the name, price, and image of a product and generate a product card using such information. The product card may be displayed in a personal shopping assistant window such that the user is able to recall previously observed products. As the user continues to browse similar products, the personal shopping assistant may identify when the user visits a product page, save the information, and generate a new product card. Such a system works without active participation by the user. As such, the user may continually browse products and compare previously observed products.

Furthermore, the personal shopping assistant may use the extracted attributes to intermittently check price information. For example, the personal shopping assistant notifies the user when a price of a product changes or alerts the user that another website has the same product at a lower price.

The user interface page classification system is configured to identify when a user visits a product page by identifying elements of a known product page schema. For example, merchants such as AMAZON.com may use a particular schema for its product pages. As such, the user interface page classification system identifies, using the known schema, the price of the product, name of the product, and an image of the product (e.g., attributes) to generate a product card. However, the user interface page classification system may not be configured to classify all visited product pages as product pages. For example, if a user visits a merchant that is not previously known by the user interface page classification system, the system may not be able to identify that the webpage is a product page, and as a result, cannot identify attributes for creating a product card. The implementations described herein provide a system and method that allows a user to train the user interface page classification system to recognize product pages of unknown (or not previously known) merchants. As the user trains the user interface page classification system, product cards are generated. After training, the user interface page classification system is able to identify user interface pages as product pages that use the same or similar schemas as the previously unknown merchant's product page.

In the examples described above, the user interface pages are webpages such as product pages. It should be understood that the user interface page classification system is configured to classify other user interface pages such as application pages, documents, images etc. For example, a user may use a merchant application on a mobile device to browse products. The user interface page classification system described herein is configured to detect navigation to a "product page" within the merchant application. If the user interface page classification system fails to detect navigation to the product page within the application, then the user can train the user interface page classification system to detect such product pages on the application. The same techniques used to identify domain pages and train the user interface page classification system are usable on documents. For example, the user interface page classification system is configured to analyze a document to determine that the document is an academic article, because the user interface page classification system knows (e.g., has rules to identify) an article schema. Furthermore, the user interface page classification system is trainable such as to recognize documents as a type of domain page using the techniques described herein.

In another example, a user may take a picture, using a mobile device, of a product at a merchant store. Such a picture may include an image of the product, the product's SKU number, price, etc. The user interface page classification system is configured to analyze the image to detect that the image depicts a product, and thus the image is classified as a "domain page." The user interface page classification system may use image analysis techniques such as text detection, pattern matching, location information (e.g., the location where the image is located is associated with a merchant store), etc. to identify the image as a product page. Furthermore, the user can train the user interface page classification system to identify a captured image as a product page (domain page) by using the device's user interface such as to identify attributes within the image. Thus, the user interface page classification system is trained to identify a similar image of a product as a "domain page."

In some implementations, the user interface page classification system is configured to identify purchase confirmation pages (or confirmation emails identifying a purchased product). In these example implementations, the user interface page classification system identifies the current page/email as a purchase page (domain page), identifies and extracts attributes, and generates a card. Such attributes may be a purchase confirmation number, tracking number, name, price, purchase method, etc. Such attributes may be used to keep the user updated on the status of the product (e.g., using the tracking number to notify the user when delivery should be expected). Furthermore, the information may be associated with the previously generated product card (e.g., when the user visited the product page), to provide more information. In this implementation, when the user interface page classification system fails to identify purchase pages, the user may train the user interface page classification system to identify purchase pages and attributes of purchase pages using the implementations described herein.

The above described examples are provided to describe the user interface page classification system in the context of a personal shopping assistant. However, it should be understood that the user interface page classification system can be used in other contexts or in association with another application. As another example, the user may be researching a particular topic. As the user researches, he or she may visit and peruse a number of different articles (e.g., news articles, academic articles) or documents. Rather than taking active steps to save the information associated with each different user interface page (e.g., by printing or bookmarking the user interface page), the user interface page classification system may identify when the user is observing an article page (or documents) and extract information from the article page. Such extracted information may include the author, title of the article, publication date, brief description, etc. The extracted information may be used to generate an article card for display in a research application window (e.g., a research assistant). Thus, the user may continuously browse while article information is saved and displayed for later reference. If the user interface page classification system fails to identify an article as an article page, the user may similarly train the system to recognize articles using the same schema.

Product pages, purchase pages, article pages, application pages, documents, images of products, etc. are hereinafter referred to as "domain pages." As such, the user interface page classification system described herein is used to identify when a user visits or navigates to a domain page, extract relevant information from the domain page, and use the extracted information to generate a "domain card." The figures are generally described with respect to using the user interface page classification system with a personal shopping assistant that displays product cards, but it should be understood that the user interface page classification system may be used in other contexts, such as with the research assistant described above. It should also be understood that the user interface page classification system is able to identify domain pages regardless of the method of navigation to such domain pages. For example, a user may receive an email with a document attached, and the document may be identified as a domain page. In another example, the user may open a link to a domain page in an email and the user interface page at the link is identified as a domain page.

The domain pages may be identified (classified) using a rule set configured to recognize the schema used by the domain page. Returning again to the AMAZON.com example described above, AMAZON.com may use the same pattern of elements (price, image, description, reviews, etc.) on product pages. Information associated with the webpage such as HTML tags, CSS selectors, and document object model (DOM) elements used to define, arrange, and display the elements may all be referred to as the product page's "schema." As such, the rule set is configured to identify attributes/elements in a schema. If the rule set is not able to recognize a schema or identify elements, then the user interface page may not meet a domain page condition such as to classify the user interface page as a domain page. When training the user interface page classification system, the rule set is updated such as to recognize the new schema such that the user interface page classification system may recognize other user interface pages using the same schemas as domain pages. These and other concepts are described further with respect to the figures.

The rule set is also configured to identify "schemas" in applications such as merchant applications. For example, if the user uses the AMAZON mobile application rather than a browser to view products, then the rule set is configured to identify when a user navigates to a product page within the application. Thus, the schema of a product page within the application is known by the rule set. Similarly, if the rule set fails to identify a visited page (e.g., a user interface page) within an application as a domain page, the user can train the user interface page application system to identify the observed page as a domain page. Thus, when the user navigates to another domain page within the application, the user interface page classification system is able to identify such navigation to a domain page and classify the application page as a domain page. As such, the code, scripting language, user interface, etc. that is used to arrange the attributes within the application page is the application page, schema (e.g., the information associated with the user interface page).

The rule set is also able to identify attributes in images of products. Thus the information that defines the image is the images "schema." Furthermore, the user can train the user interface page classification system to identify attributes within an image. Moreover, the rule set is configured to identify elements in a document. Thus the text, tags, etc. that defines the arrangement of the attributes within the document (e.g., title, author, etc.) is the document's schema (e.g., the information associated with the user interface page). Thus, any code, text, data that defines an arrangement of identifiable attributes may be referred to a user interface page's schema. The user interface page classification system uses at least a portion of the schema as information associated with the user interface page to identify the attributes. Furthermore, the user interface page classification system is trainable on any of the above described schema's. Other user interface page and schemas are contemplated.

FIG. 1 illustrates a block diagram 100 of an example workflow of a user trainable user interface page classification system 116 disclosed herein. The workflow is described in the context of a user navigating to one or more domain pages (e.g., domain pages 106) using an application (e.g., a web browser) executing on a user device such as a laptop, desktop, smart device, etc. In the workflow illustrated in FIG. 1, the domain pages 106 are product pages and the user interface page classification system 116 is described with respect to a personal shopping assistant 134, but it should be understood that the domain pages 106 may be a page relevant to the user's journey or quest corresponding to the user's intent in navigating between user interface pages. For example, a domain page may be any page for which a user may want to save for later retrieval and reference in association with a particular journey (e.g., a user's intent in visiting the domain page). In the example illustrated in FIG. 1, the user's quest relates to researching and/or purchasing a product and the domain pages 106 are product pages. In another example the user's journey may be to research a particular topic, and as such, the domain pages 106 may be article pages (e.g., news articles). Other types of domain pages, identification of such domain pages, and the generation of corresponding domain cards are contemplated.

The user interface page classification system 116 monitors different user interface pages that the user visits. For example, the user may visit user interface pages through a web browser, a file browser, an application, an image browser, etc. As the user navigates to different user interface pages, a domain page classifier of the user interface page classification system 116 determines whether the current page is a domain page (e.g., a product page in the illustrated example). It should be understood that the domain page classifier 130 is configured for the particular domain type depending on the context. In the illustrated context of the personal shopping assistant 134, the domain page classifier 130 is configured to determine whether a current user interface page is a product page. If the domain page classifier 130 determines that the current page is a product page, an information extractor 136 of the user interface page classification system 116 extracts attributes from the product page and creates a product card (e.g., a product card 112). The attributes may include a product name, price, and image. Other attributes may include reviews and rating. The created product card (e.g., product card 112) is displayed in a personal shopping assistant pane 110. The personal shopping assistant pane 110 may be displayed as part of the application (e.g., web browser) or a stand-alone application. As the user visits different product pages and the user interface page classification system 116 detects (e.g., classifies) the page as a product page, product cards (e.g., the product card 112) are generated and displayed on the personal shopping assistant pane 110. As such, the personal shopping assistant pane 110 may be used by the user for reference in comparing products, retrieving information about products visited in the past, etc. The user interface page classification system 116 in conjunction with the personal shopping assistant 134 is passive. In other words, the product pages are detected and product cards are generated and displayed without any action by the user (other than navigation between pages).

As the user navigates between user interface pages, the domain page classifier 130 applies a rule set to information associated with the current page to determine whether the current page may be classified as a product page (domain page). Known websites such as AMAZON.com and OVERSTOCK.com may use product page schemas that are known by the domain page classifier 130. Such known schemas may include commonly used CSS elements in commonly used order, etc. As such, the rule set may be configured to first analyze the URL of the user interface page to determine whether the user interface page is associated with a known product page schema. If the user interface page URL is associated with a known schema, a particular subset of the rule set may be selected and applied to the user interface page's document object model (DOM) to extract attributes (e.g., attributes identified by CSS selectors) to generate the product card for the product page. The rule set may identify attributes by identifying tags and elements in the DOM using pattern matching techniques and element identifying. For example, the rule set may be configured to identify a price of a product by using regular expressions. In another example, the rule set is configured to identify an image associated with the product by identifying an image element in the DOM. Other techniques to identify attributes are contemplated. Furthermore, the rule set is configured to identify domain pages within an application. For example, if the user is browsing products within a merchant application, the rule set is configured to capture attributes from the schema of the application user interface page.

If the current user interface page is an image, certain aspects of the rule set that are associated with analyzing images may be used to classify the image as a product page. For example, text extraction techniques may be used to extract text from an image (e.g., to identify a name or price of a product). The rule set may use pattern matching techniques to identify the product itself in the image. The rule set may use the location where the image was taken to identify whether the location is associated with a merchant store. Other image analysis techniques are contemplated.

If the user interface page is not associated with a known product page (domain page) schema, then the rule set may be configured to analyze the information associated with the webpage (e.g., HTML tags, CSS selectors, DOM, etc.) to determine whether the user interface page is a product page using similar techniques. For example, the attribute identification and pattern matching techniques described above may be used to attempt to identify a number of attributes such as to meet a product page (domain page) condition (e.g., a threshold). For example, if the rule set is able to identify a price, image, and name of a product, then the domain page condition is satisfied and the user interface page is classified as a product page. The identified attributes may then be used to generate a product card that is displayed in the personal shopping assistant pane 110. Application of the rule set to the information associated with the user interface page determines whether the user interface page meets a domain page condition (e.g., the URL is associated with a known schema, the rules are able to identify a threshold number of attributes, etc.).

When the user interface page classification system 116 classifies a visited user interface page as a product page, an icon may be displayed on the application (e.g., a browser application, file viewer). For example, the user interface page classification system 116 classifies user interface page 120 as a product page and displays a heart icon 122 on the user interface page. Such an icon notifies the user that the user interface page is classified as a product page. It should be understood that other notification methods and icons may be used to notify the user that the user interface page has been classified.

In some instances, the domain page classifier 130 fails to classify a current user interface page as a product page. In FIG. 1, the domain page classifier 130 has correctly classified user interface pages 120, 124, and 126 as product pages, which is illustrated by the displayed icons and the corresponding product cards displayed in the personal shopping assistant pane 110. However, the user interface page classification system 116 has failed to classify user interface page 108 as a product page. As such, no icon is displayed and no product card has been created. The rule set may fail to identify the URL associated with the user interface page 108 as being associated with a known schema, or alternatively, the rule set may not have identified a threshold number of attributes such as to classify the user interface page 108 as a product page. In another example, the user interface page classification system 116 identified and extract the wrong elements for attributes. In other words, the user interface page 108 failed to satisfy the domain page condition. If the user notices that the user interface page classification system 116 failed to classify user interface page 108 as a product page (e.g., by noticing that the icon was not displayed, a product card was not created, or the product card displayed wrong attributes), then the user may take corrective action to classify the user interface page 108 as a product page and train the user interface page classification system 116. A user input detector 132 is configured to detect a user input to take corrective action. Furthermore, such corrective action trains the user interface page classification system 116 such that the domain page classifier 130 may classify other product pages with schemas similar to the schema of user interface page 108 as product pages. Such corrective action is described further with respect to FIG. 2 and FIG. 3.

Similarly, if the user interface page classification system fails to determine that a currently viewed image is a domain page, the user may train the user interface page classification system 116 on the currently viewed image. For example, the user may selectively identify the price, SKU number, and name of the product, and an image of the product itself within the image. Furthermore, the user may identify the location where the image was taken as being associated with a merchant store. As the user interface page classification system is trained, image analysis rules are added to the rule set such that the user interface page classification system is able to identify similar images as domain pages. For example, if a user identifies an image location (e.g., a location where an image was taken) as being associated with a merchant store, a rule is added to the rule set such that the rule set may identify images with the same location as domain pages. Furthermore, if the user identifies attributes within the image, the rule set is updated to identify attributes within similar images.

The workflow in FIG. 1 is explained with reference to a user entering the product query 102 to get the query results 104 such that the user navigates to the product pages 106. It should be understood that the user may navigate to the product pages 106 by way of other methods such as by clicking a link in an email, from another website, etc. The general process is illustrated at a general workflow 114. The general workflow illustrates that the user navigates to different user interface pages, the system determines whether a current page is a domain page (product page), and the system generates and displays a product card depending on the determination.

As described above, the user interface page classification system 116 is described in association with the personal shopping assistant 134. It should be understood that the user interface page classification system may be used in other contexts (e.g., research). As such, domain cards (product cards in FIG. 1) may vary depending on context. For example, if the user interface page classification system 116 is used in the context for saving and referencing research articles (e.g., academic articles), then the generated product/domain cards may be different. In the research example, the cards may include attributes such as title, author, publication date, abstract, etc. Other types of cards are contemplated based on the associated context.

A datastore 118 stores the rule set that is applied to the user interface page information. The datastore may be local to the device (e.g., laptop, smart device, etc.) and/or may be remote and accessible through the network. As the user interface page classification 116 system is trained, new rules are generated for the rule set. As such, the rule set is updated in the datastore 118. In some implementations, the new rules may be pushed to the cloud and shared among users such that user interface page classification systems of a plurality of devices are trained by all users. Furthermore, an administrator may determine whether the updated rule is authorized before the rule is pushed to all users. In other implementations, the administrator may designate one or more users of the user interface page classification system as a power user. Such a power user's training (new rules) may be automatically pushed to other users (e.g., without administrator authorization). In another implementation, rules for particular merchants are cross checked to make sure that the rules for merchants have a threshold level of agreement. For example, if user A and B both train their respective user interface page classification systems on domain pages of example.com, then the rules are crossed checked to determine a level of agreement before the rules are distributed to other users. These and other methods of pushing rules to a number of users are contemplated.

Figure 2:
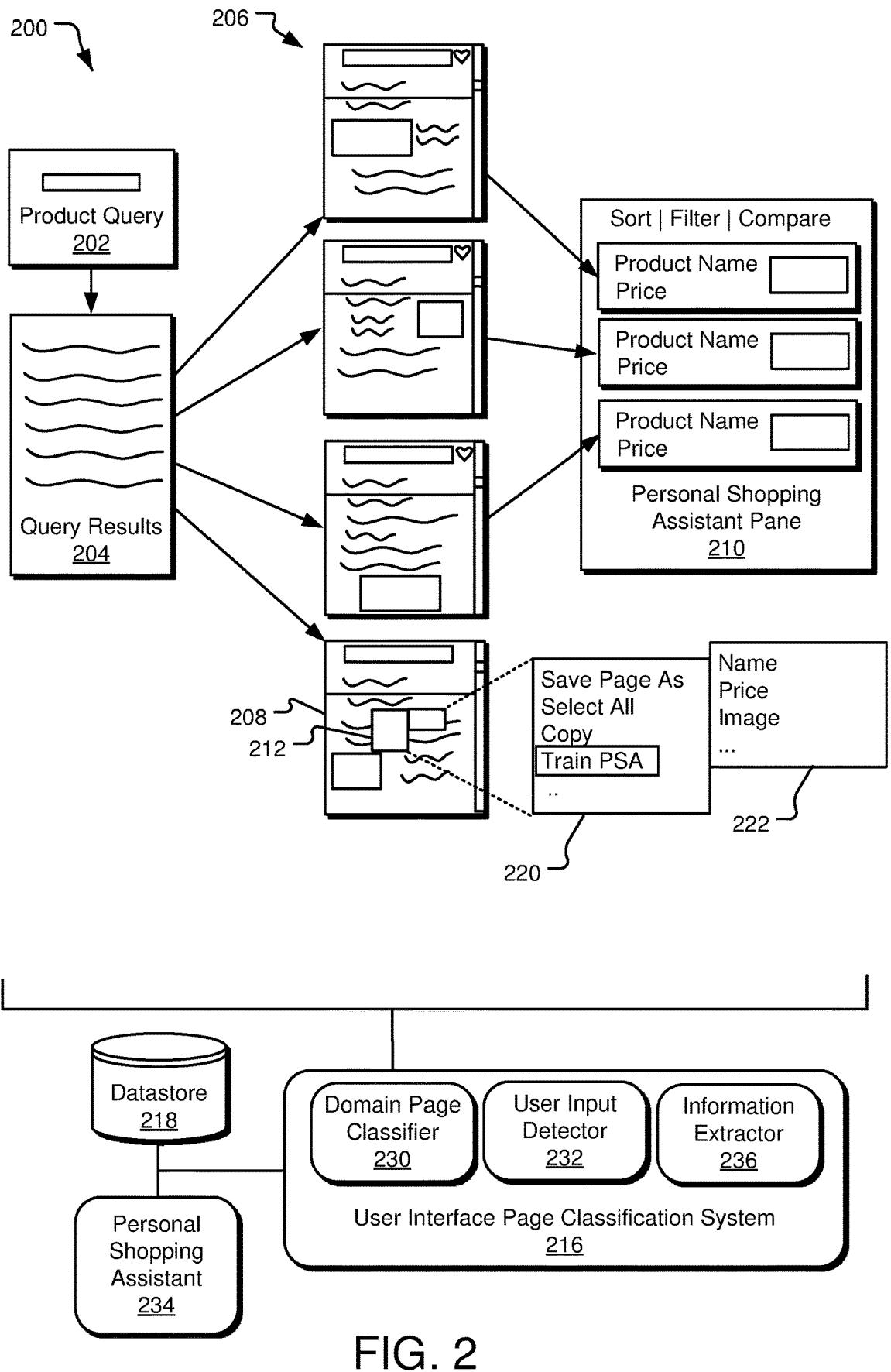
FIG. 2 illustrates another block diagram of an example workflow of a user trainable user interface page classification system disclosed herein.

FIG. 2 illustrates another block diagram 200 of an example workflow of a user trainable user interface page classification system 216 disclosed herein. Specifically, FIG. 2 illustrates corrective action taken by a user when the user notices that the user interface page classification system 216 (via a domain page classifier 230) has failed to classify a user interface page 208 as a product page. In FIG. 2, the domain page classifier 230 determined that information associated with the user interface page 208 (e.g., a URL, CSS selectors, HTML tags, DOM that defines the user interface page 208 schema) of user interface page 208) did not meet a domain page condition. This determination was made by an application of a rule set retrieved from a datastore 218 to the information associated with the user interface page 208. As such, domain page classifier 230 did not classify the user interface page 208 as a domain page. If the user interface page 208 is in fact a domain page, then the user may take corrective action to reclassify the user interface page 208 as a domain page and train the domain page classifier 230 of the user interface page classification system 216 to classify other user interface pages with schemas similar to the user interface page 208 as a domain page. For example, the user may have noticed that the user interface page 208 did not display an icon or that a product card corresponding to the product of the user interface page 208 was not displayed in the personal shopping assistant page 210. The user interface page classification system 216 is configured to provide a menu (e.g., a menu 212 and an expanded view 220) such that a user may command the user interface page classification system 216 to classify a user interface page is a product page. For example, the user right clicks on the user interface page 208 such as to cause the menu 220 to be displayed. The menu 220 includes standard commands (e.g., "Save Page As," "Select All," and "Copy," and a command to reclassify the user interface page (e.g., "Train PSA" (Personal Shopping Assistant)). The user may click the "Train PSA" command to reclassify the user interface page 208 as a product page and train the PSA. The menu 220 is shown with reference to a user right clicking to display the menu 200, but it should be understood that the menu may be located in a toolbar, etc.

When the user commands (e.g., by clicking "Train PSA" in the menu 220) the user interface page system 216 to reclassify a current user interface page (e.g., the user interface page 208) as a product page (or domain page), a user input detector 232 detects the user input and notifies the domain page classifier 230 that a domain page condition is satisfied. The user input detector 232 may be a type of event handler. Responsive to the domain page condition being satisfied, the user interface page classification system 216 (e.g., the domain page classifier 230) reapplies a rule set to information associated with the user interface page such as the URL, the DOM of the user interface page, HTML tags, CSS selectors, image information, or document information. As the rule set is applied to the information associated with the user interface page, an information extractor 236 extracts attributes of the user interface page (or product page) using pattern matching techniques such as regular expressions. The information extractor 236 (via the rule set) is also configured to identify elements of the DOM such as image elements. As the rule set is applied to the information associated with the user interface page 208, the schema is identified, and new rules may be added to the rule set to classify, as domain pages, user interface pages using the same or similar schemas. Further responsive to the user input, the attributes may be used by a personal shopping assistant 234 to generate a product card to be displayed in the personal shopping assistant pane 210.

In some implementations, the user may direct the user interface page classification system to certain attributes of the domain page by right clicking on the location of the attribute in the user interface page. For example, the user right clicks on the price of a product displayed by the user interface page 208. Other methods of location identification are contemplated (e.g., by touching a location on a tough screen device). Responsive to the location identification, the menu 220 is displayed. The user may navigate to the "Train PSA" command which brings up a secondary menu 222. Finally, the user may select the "Price" option. Responsive to the price selection, the user interface page classicization system 216 may apply a subset of the rule set that relates to price (e.g., regular expressions that configured to identify price listings) to elements in the DOM that are identified as being located on or near the location of the right click. For example, the DOM of the user interface page may be traversed to identify the general CSS selector that matches the identified attribute. The general CSS selector may be stored in as a rule in the rule set (e.g., a domain extraction logic). As such, the user assists the user interface page classification system 216 in identifying specific attributes of a domain page. It should be understood that the user selecting an attribute as being associated with the location is a command to classify the user interface page as a domain page. In other words, the user selecting a specific attribute in association with the location alerts the user interface page classification system 216 that the domain page condition is satisfied.

The rule set comprises a number of different types of rules for identifying information. The rule set may include domain page identification rules and attribute extraction rules. For example, the rule set may include a number of different regular expressions for identifying price elements. Such regular expressions may include regular expressions of identifying prices in U.S. Dollars, British pounds, euros, etc. Furthermore, some jurisdictions use price symbols in different ways (e.g., € 3.50 vs. 3.50 €). As such the rule set is configured to identify the different uses. The rule set is also configured to identify CSS elements/selectors in the DOM of the user interface page.

For the domain of products in the scope of webpages, the rule set includes rules for detecting product pages and specific attributes of the product. A webpage with a single product with details about the product such as description, specifications, price, images, ratings, and reviews is considered a product webpage. A webpage that includes search results with multiple products, catalog pages, articles about a product, third party reviews and other websites that does not offer the product or do not specify details and facts about a single product are not product pages, and are thus not classified as a domain page (product page) by the rule set. The attributes extracted for a product page include the product name, a dominant image depicting the product, price, user ratings score, number of user reviews, URL of the page, web site domain name, which indicates the seller or marketplace name.

In detecting product pages and extracting attributes, the rule set is configured use a combination of the following techniques:

(1) Presence of HTML <META> tags with open graph and/or schema.org specification of type "Product" or "Offer." For example, from http://www.calvinklein.us/shop/en/ck/mens-clothing/mens-apparel/mens-jeans/25564834, the HTML source code includes:

```
"<div id="body588_product" class="page-detail" itemscope=""
itemtype="http://schema.org/Product">"
```

Thus, the user interfaced page classification system recognizes the webpage as a product page due to its use and identification of the schema.org product schema.

(2) Regular expression match of the web page URL to a specific product page pattern unique to the website. For example, for https://www.ashleyfurniturehomestore.com/p/zilmar-dining-room-chair/d448-01/, a regular expression rule is:

```
"ashleyfurniturehomestore":
{"ProductRegex":"^(http(s)?)://(.*)ashleyfurniturehomestore\.(.*)/p/(.*)", ...}
```

Thus, the user interface page classification system 216 would recognize specific web pages from the domain "ashleyfurniturehomestore" whose URL matches with the above pattern (regular expression), as potential product pages and will attempt to extract product attributes.

(3) Successful extraction of a subset of key product attributes like a name, image, and price that signifies that the webpage is a product page. For example, for http://www.bmionline.com/teachers-guides/26-fairmount-avenue-novel-tie_p6886.aspx, the user interface page classification system attempts to extract the name, image, and price of the product, which are required for the user interface page classification system to recognize a webpage as a product page for the website bmionline.com. The attributes may be extracted using a combination of the rules discussed below, and, in some implementations, all three attributes are needed. This ensures that non-product pages that may satisfy other rules specified for product detection and attribute extraction are not erroneously recognized as product pages.

The rule set is configured to extract product attributes using a combination of the following:

(1) Product attributes specified using standards such as Schema.org or Open Graph inside a HTML <META> tag.

For example, from http://www.calvinklein.us/shop/en/ck/mens-clothing/mens-apparel/mens-jeans/25564834, the tags are arranged as follows:

```
<meta property="og:url" content="http://www.calvinklein.us/shop/en/ck/25564834" />
<meta property="og:title" content="sculpted metal black slim jeans | Calvin Klein" />
<meta property="og:description" content="sculpted jeans designed with innovative stretch fabric and engineered seams to lengthen, lift and hug in all the right places." />
<meta property="og:provider_name" content="Calvin Klein" />
<meta property="og:brand" content="jeans" />
<meta property="og:product_id" content="4982002" />
<metaproperty="og:price:standard_amount" content="$89.50" />
<meta property="og:price:amount" content="$98.00" />
<meta property="og:price:currency" content="USD" />
<meta property="og:type" content="product" />
<meta property="og:site_name" content="Calvin Klein" />
<meta property="og:image" content="http://calvinklein.scene7.com/is/image/CalvinKlein/25564834_010_main?wid=390&hei=515&fmt=jpeg&qlt=90%2c0&op_sharpen=1&resMode=trilin&op_usm=0.8%2c1.0%2c6%2c0&iccEmbed=0" />
```

Product attributes are derived from the tags as follows:
  Name of the product from "og:title" property
  Unique product identifier from "og:product_id" and "og:url" properties
  Price from "og:price:standard_amount" and "og:price_amount", whichever is lower
  Currency from "og:price_Currency"
  Product image from "og:image" property (2) Text specified within HTML tags. For example, the title or name of the product may be specified inside a <h1> HTML tag. For example, from: https://www.ashleyfurniturehomestore.com/p/zilmar-dining-room-chair/d448-01/, the HTML includes the following:

```
<div class="carousel-SideInfo medium-4 column">
 <div class="Product-SideInfo">
    <div id="scphbody_0_prodFlagDiv" class="
```

-continued

```
productFlagStyle secondaryFlagStyle" style="color:;background:;border-
color:;display:none;">
        </div>
    <h1>Zilmar Dining Room Chair <em></em></h1>
```

The name of the product is extracted from the text for the <h1> Tag as "Zilmar Dining Room Chair."

(3) A cascading style sheet (CSS) selector to uniquely identify the HTML tag, when there are multiple HTML tags of the same type such as a <DIV> or a <SPAN>. These selectors provide a path to the specific tag in the document object model (DOM) of the page or a unique style class identifier specified as an attribute of the HTML tag. Also multiple selectors can be included to account for variations of product web pages and these are applied in the sequence order in which they are specified. For example, for the seller www.tesco.com, the rule for the name attribute is specified as follows:

```
""tesco":{
    "Name": ["#productLabel", "h1 > span", "#leftDesc > div > h1"],
}
```

The name of the product could be derived from 3 possible elements in the following order of precedence:
A. From the text of an HTML element with the "id" property set as "productLabel"
B. From the text within a HTML "<span>" tag appearing after a "<h1>" tag in the document object model of the web page
C. From the text within a "<h1>" tag appearing after a "<div>" tag which is a child of an HTML element with "id" property set as "leftDesc"

Additional attribute specific rules are utilized to extract the right product attribute value. For example, for price of the product, the text identified from the CSS rule is parsed and matched with a list of currency symbols or 3 letter ISO codes for currencies. Additionally, locale specific price representation styles such as the use of commas or periods for hundred or thousand or decimal point separators are normalized for storage and displayed in the locale style to the user.

A unique identifier of an identified product page may be generated by using:
A. The unique product page URL specified using Open Graph or Schema.org standard inside a HTML meta; or
B. A combination of the web site domain and a product identifier like UPC of stocking number.

Subsequent browser visits to the same product page are tracked and a visit count is shown to the user. The unique product identifier enables accurate tracking and is insulated from changes in the product page's URL address that are introduced for tracking by the publisher of the website.

When the user interface page classification system 216 is used in different context (e.g., for research application rather than the personal shopping assistant 234), then the rule set is different. In the context of research, the rule set is configured to identify different elements such as title, author, publication date, etc. Moreover, the different subsets of the rule set may be applied depending on the stage in web classification. For example, for an initial determination of whether the current page is a domain page, the URL may be used to see if the URL is known (e.g., by comparing the website's URL to a URL index). If the URL is known and thus has a known schema, then a subset of the rule set associated with the known may be applied to the DOM. If the URL is not known, a different subset of the rule set may be used to attempt to identify a number of attributes above a threshold. If the user interface page classification system is directed to classify a current user interface page as a domain page (e.g., training the user interface page classification system), then the subset of the rule set that is applied may be different. Furthermore, if the location is used in association with a selected attribute, then a subset of the rule set associated with the selected attribute may be applied to the information corresponding to the location.

As described above with respect to FIG. 1, the user may navigate to user interface pages 206 and user interface page 208 (e.g., webpages) by entering product query 202 to get query results 204. The user may then click on links in the query results 204 to navigate to the user interface pages 206 and 208. It should be understood that the user may navigate to the user interface pages 206 and 208 by other methods. It should also be understood that the user interface pages may be webpages, application pages, images, documents, etc.

Figure 3:
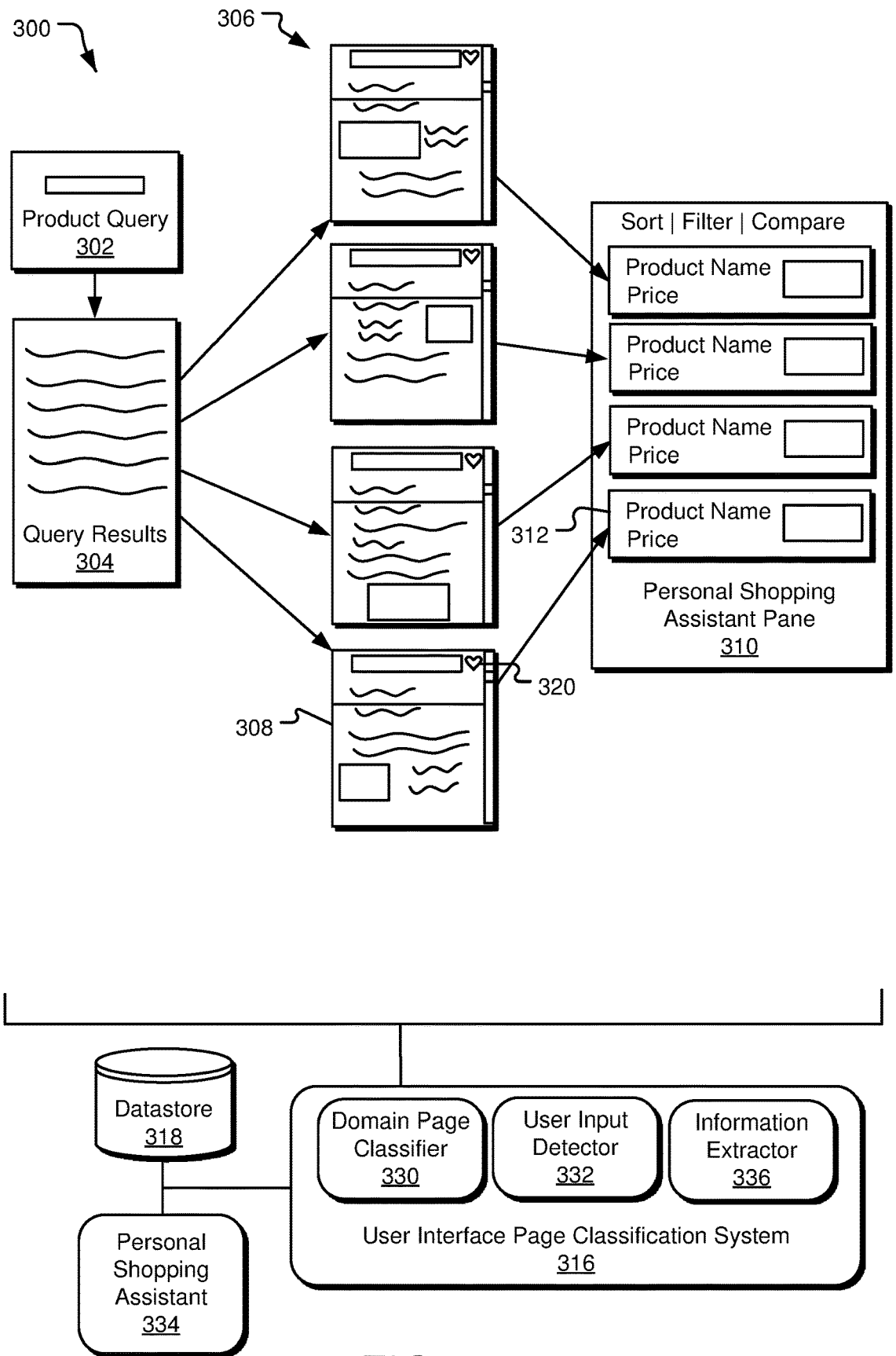
FIG. 3 illustrates another block diagram of an example workflow of a user trainable user interface page classification system disclosed herein.

FIG. 3 illustrates another block diagram 300 of an example workflow of a user trainable user interface page classification system disclosed herein. Specifically, FIG. 3 illustrates a result of a user directing a user interface page classification system 316 (and a domain page classifier 330) to classify a user interface page 308 as a domain page. A user input detector 332 detects the user input to reclassify the user interface page 308 as a domain page. Because the user interface page 308 is reclassified as a domain page, an icon 320 is displayed. The icon notifies the user that the user interface page 308 is classified as a domain page (product page). Furthermore, because a rule set was applied to information associated with the user interface page 308 (e.g., the URL and/or DOM of the user interface page), attributes have been extracted (using an information extractor 236) from the user interface page and a product card 312 has been generated (by a personal shopping assistant 234) and displayed in a personal shopping assistant pane 310. The product card displays the identified attributes (e.g., the product name, price, and an image).

Further since the user interface page 308 has been classified as a domain page, one or more new rules generated based on the information associated with the user interface page 308 have been added to the rule set. The updated rule set may be updated in a datastore 318. As a result, user interface pages that have the same or similar schemas to the user interface page 308 may be automatically classified as a domain page. The user has effectively trained the user interface page classification system 316 to classify user interface pages that have the same or similar schemas to the user interface page 308 as domain pages.

The user can encode rules (e.g., update the rule set) into the rule set to domain pages and their attributes, by simply assigning attribute labels to various elements in the page. The user interface page classification system 316 automatically encodes the CSS selectors from the DOM for the elements the user assigns and proceeds to extract additional attributes using the methods described above with respect to FIG. 2. The user has the option to correct these automatic deductions for other attributes, if they are incorrect, by once again assigning specific attribute labels to appropriate elements in the page. These corrections are merged with existing rules and hence preserve any older patterns that may still be valid for a subset of the domains. The user also has the facility to order the priority of the rules applied for a specific domain attribute with a web site or web site subdomain.

For example, in the context of a product a page https://www.eurocali.it/lenti-a-contatto/901-giornaliere-ciba-vision-focus-dailies-30.html, the elements include:

```
"eurocali": {
    "Name": [
        ".title_detailproduct"
    ],
    "Price": [
        "#our_price_display"
    ]
},
```

The user interface page classification system 316 is able to extract most product attribute details using the standard meta data tags such as open graph and schema.org, but some key attributes like price may not be encoded in these meta tags. The user can pick these elements visually from the page and encode the corresponding CSS selector. In the above example, the Name is picked from HTML element with style sheet class name "title_detailproduct" and the price from the text of the HTML element with the "id" property set as "our_price_display". The user clicks/right clicks on the element and CSS selector is encoded, and the user interface page classification system 316 attempts to extract all the other product attributes as well. The user can inspect the results by simply opening the assistant and checking the product card details, and make changes directly to the encoded rules if needed.

A similar scheme can be employed in the case of product details pages or screens in mobile applications (e.g., a merchant application). The user assigns attribute labels to specific elements on the screen and the corresponding rules to map product attributes to visual elements and extract their values is encoded. The rules will be adapted to the specific phone platform's user interface rendering model, utilized in the application. For physical products, the user may capture the product on store aisle through the camera or utilize a picture of the product taken in the past, and annotate/label parts of the image to product attributes. A suitable image recognition and information extraction system (like Optical Character Recognition System), can aid the user with automatic value extractions for the attributes mapped to specific parts of the image.

Once a new set of rules are encoded in this way, say in the case of a product webpage, these are stored in a local instance of the user interface page classification system, and are triggered during subsequent visits to a similar product page within the web site. Rules trained for new product patterns and web sites across users and their instances are aggregated centrally on the server/cloud. They are validated with a sample of product pages from the target web sites and from across other users. A statistical score is generated for rules and their orderings per product domain across users based on their frequency of product extractions. These are merged and weighted by this frequency and published to all users, propagating the learnings across the community of users. A human editor can also guide the merge and make appropriate corrections before publishing to all users. The synthesis of rules collected for a product website from multiple users can also be done as a machine learning problem by using their respective product extractions, both successful and unsuccessful, as labels.

As described above with respect to FIG. 1 and FIG. 2, the user may navigate to user interface pages 306 and user interface page 308 by entering product query 302 to get query results 304. The user may then click on links in the query results 304 to navigate to the user interface pages 306 and 308. It should be understood that the user may navigate to the user interface pages 306 and 308 by other methods.

Figure 4:
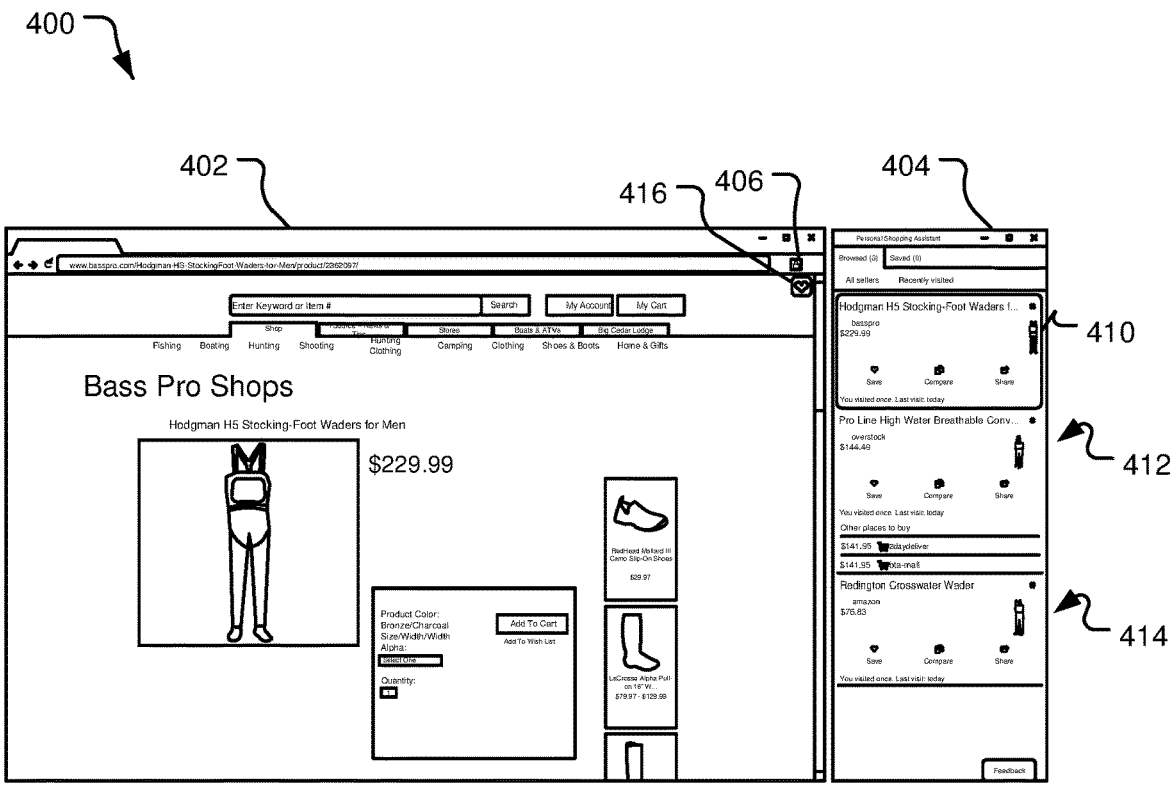
FIG. 4 illustrates an example screen display illustrating the user trainable user interface page classification system disclosed herein.

FIG. 4 illustrates an example screen display 400 illustrating the user trainable user interface page classification system disclosed herein. Specifically, FIG. 4 illustrates the user trainable user interface page classification system in the context of a personal shopping assistant. The personal shopping assistant is displayed as the personal shopping assistant pane 404. The personal shopping assistant is included as an add-on or extension to a browser 402. The browser 402 includes an icon 406 for the personal shopping assistant system.

As illustrated in FIG. 4, the personal shopping assistant pane 404 displays product cards 410, 412, and 414. The product cards 412 and 414 were generated based on previous user navigation to the corresponding product pages. The user interface page classification system extracts the attributes (e.g., name, price, picture) from the product pages when the user navigated to those pages. The product card 410 represents the current product page (e.g., the product page displayed in browser 402). Furthermore, because the user interface page classification system has identified the current page as a product page, an icon 416 is displayed in the upper right corner of the browser window. The icon 416 notifies the user that the user interface page has been classified as a product page by the user interface page classification system associated with the personal shopping assistant.

Figure 5:
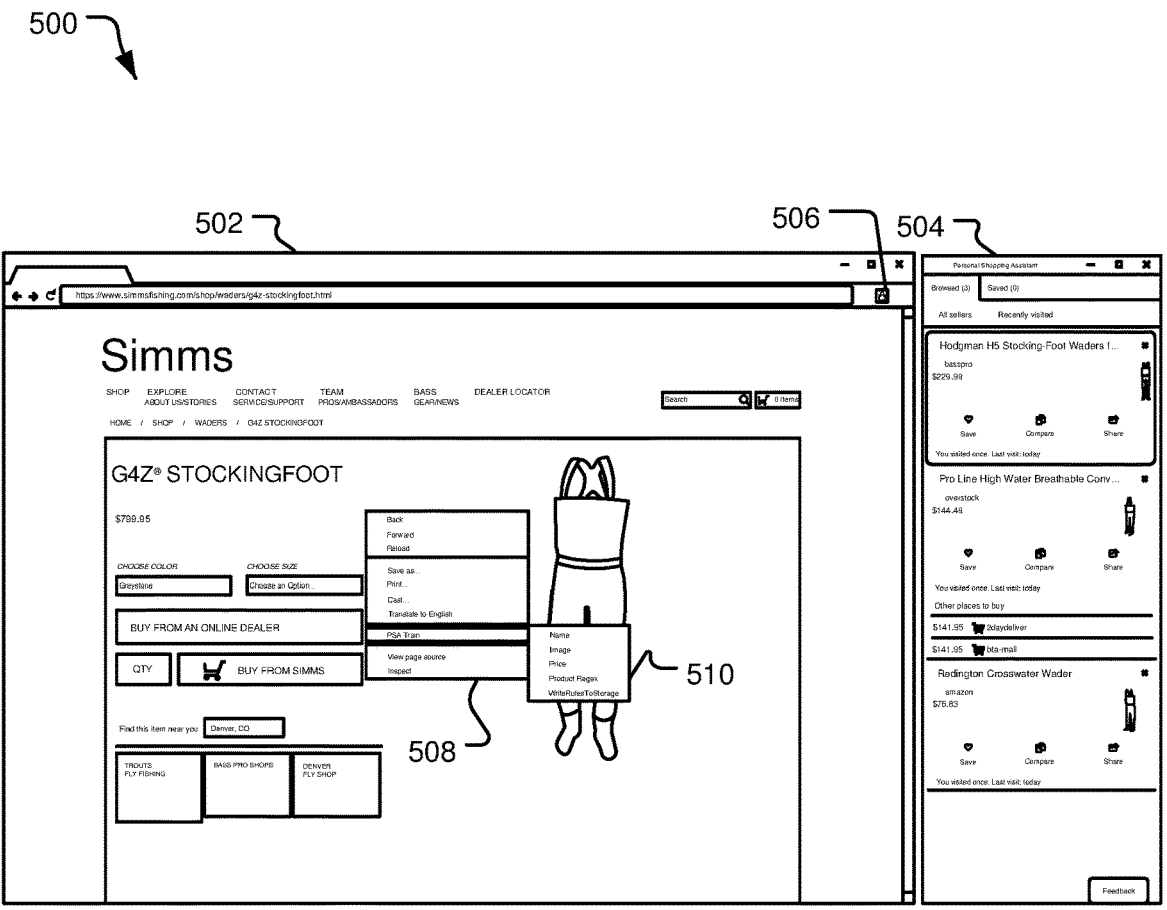
FIG. 5 illustrates another example screen display illustrating the user trainable user interface page classification system disclosed herein.

FIG. 5 illustrates another example screen display 500 illustrating the user trainable user interface page classification system disclosed herein. Specifically, FIG. 5 illustrates the user trainable user interface page classification system in the context of a personal shopping assistant. The personal shopping assistant is displayed as the personal shopping assistant pane 504. The personal shopping assistant is included as an add-on or extension to a browser 502. The browser 502 includes an icon 506 for the personal shopping assistant system.

In FIG. 5, the browser is displaying a product page. However, the user interface page classification system associated with the personal shopping system has failed to classify the user interface page as a product page. A user may be alerted the failure of classification by the lack of the icon in the upper right hand corner of the browser 502 (e.g., as illustrated in FIG. 4). Furthermore, no product card corresponding to the current page has been generated and displayed in the personal shopping assistant pane 504. Responsive to the failure of classification of the user interface page as a product page, the user right clicks on the user interface page to display a menu 508. The user navigates to "PSA train" in the menu 508. In some implementations, the user clicks the "PSA Train" option, which the user interface page classification system detects. Responsive to the selection of "PSA Train," the domain page condition is satisfied and the user interface page classification system reclassifies the user interface page as a domain page (product page). Further responsive to the selection of "PSA Train," information is extracted from the user interface page. Such information includes attributes for generation of a product card to be displayed in the personal shopping assistant pane 504 and information for creating one or more new rules for classifying other user interface pages with the same or similar schemas as product pages.

In implementations, the user may assist the user interface page classification system in identifying specific attributes. The user may identify attributes by right clicking on the attributes. For example, the user clicks on the name of the product (e.g., G4Z STOCKINGFOOT) and navigates to "PSA Train" in the menu 508, which displays a secondary menu 510. The user may then click the "Name" option, which notifies the user interface page classification system that the location of the right click should be associated with the name attribute. The user interface page classification system uses the location and the name attribute to identify the name attribute. Such location assistance can be used to identify other attributes such as price, image, reviews, etc.

Figure 6:
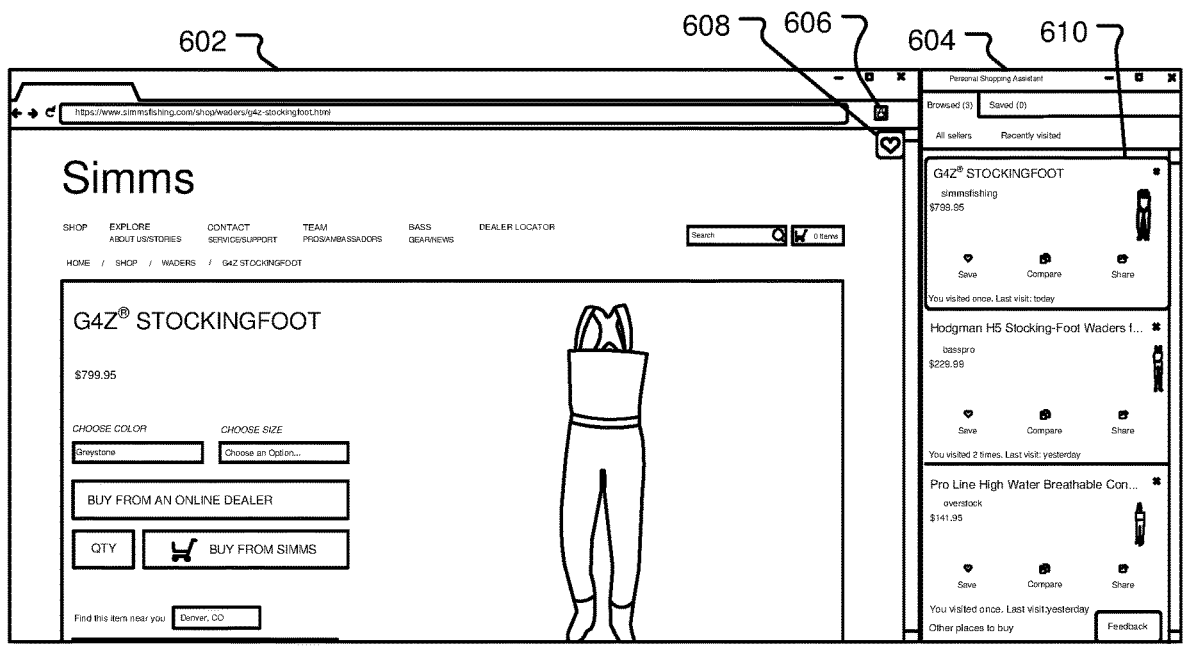
FIG. 6 illustrates another example screen display illustrating the user trainable user interface page classification system disclosed herein.

FIG. 6 illustrates another example screen display 600 illustrating the user trainable user interface page classification system disclosed herein. Specifically, FIG. 6 illustrates the user trainable user interface page classification system in the context of a personal shopping assistant. The personal shopping assistant is displayed as the personal shopping assistant pane 604. The personal shopping assistant is included as an add-on or extension to a browser 602. The browser 602 includes an icon 606 for the personal shopping assistant system. In FIG. 6, the user has trained the user interface page classification system to classify the user interface page (from FIG. 5) as a product page. Because the user interface page classification system now classifies the user interface page as a product page, an icon 608 is displayed, and a product card 610 is generated and displayed in the personal shopping assistant pane 604.

Figure 7:
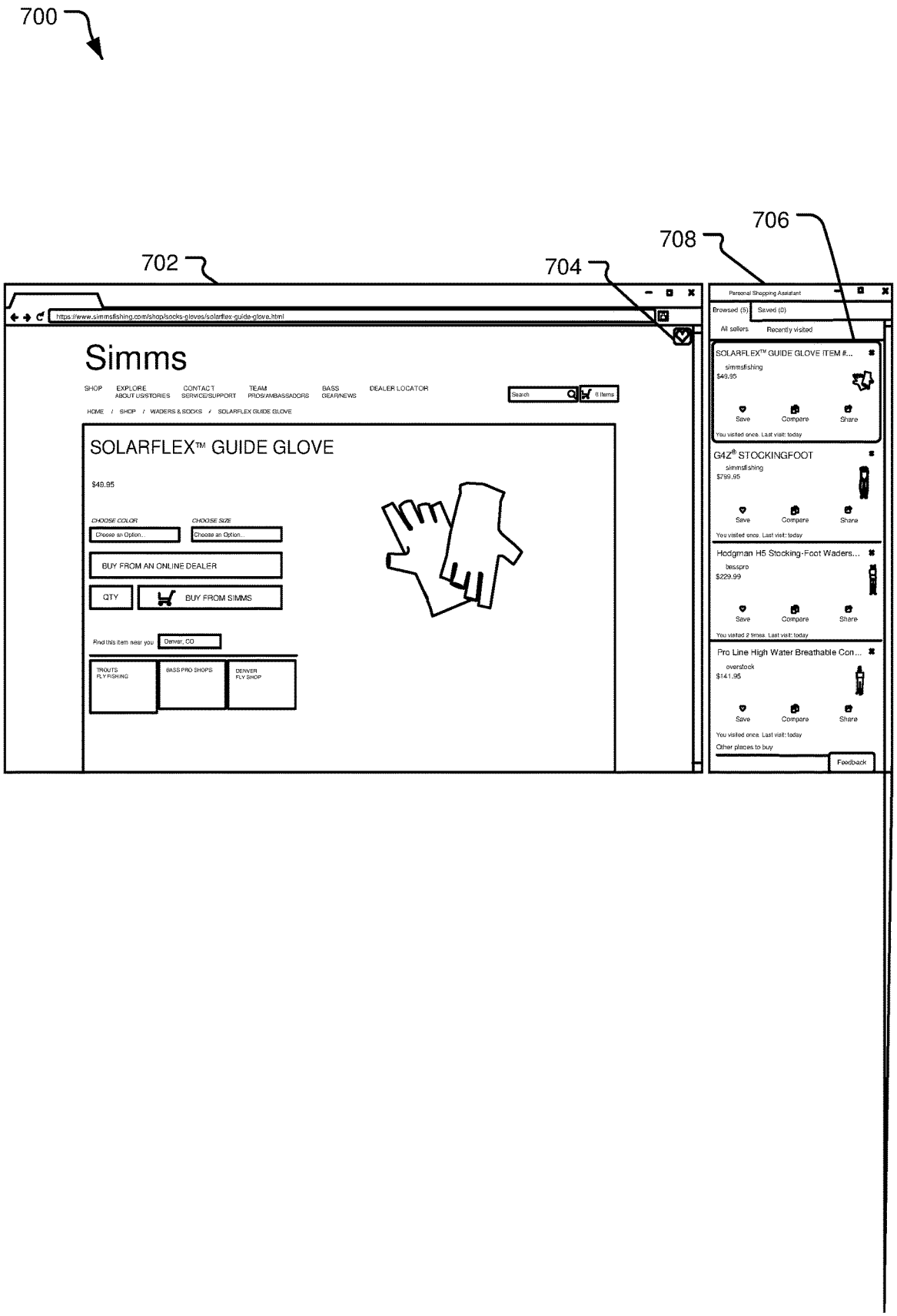
FIG. 7 illustrates another example screen display illustrating the user trainable user interface page classification system disclosed herein.

FIG. 7 illustrates another example screen display 700 illustrating the user trainable user interface page classification system disclosed herein. Specifically, FIG. 7 illustrates a product page in a browser 702 from the same website/merchant as shown in FIG. 5 and FIG. 6. Because the user has trained the user interface page classification system to identify product pages (e.g., that use the same or similar schemas), the user interface page classification system classifies the user interface page as a product page. The use is notified that the user interface page was classified as a product page by the icon 704 and the product card 706 displayed in a personal shopping assistant pane 708.

Figure 8:
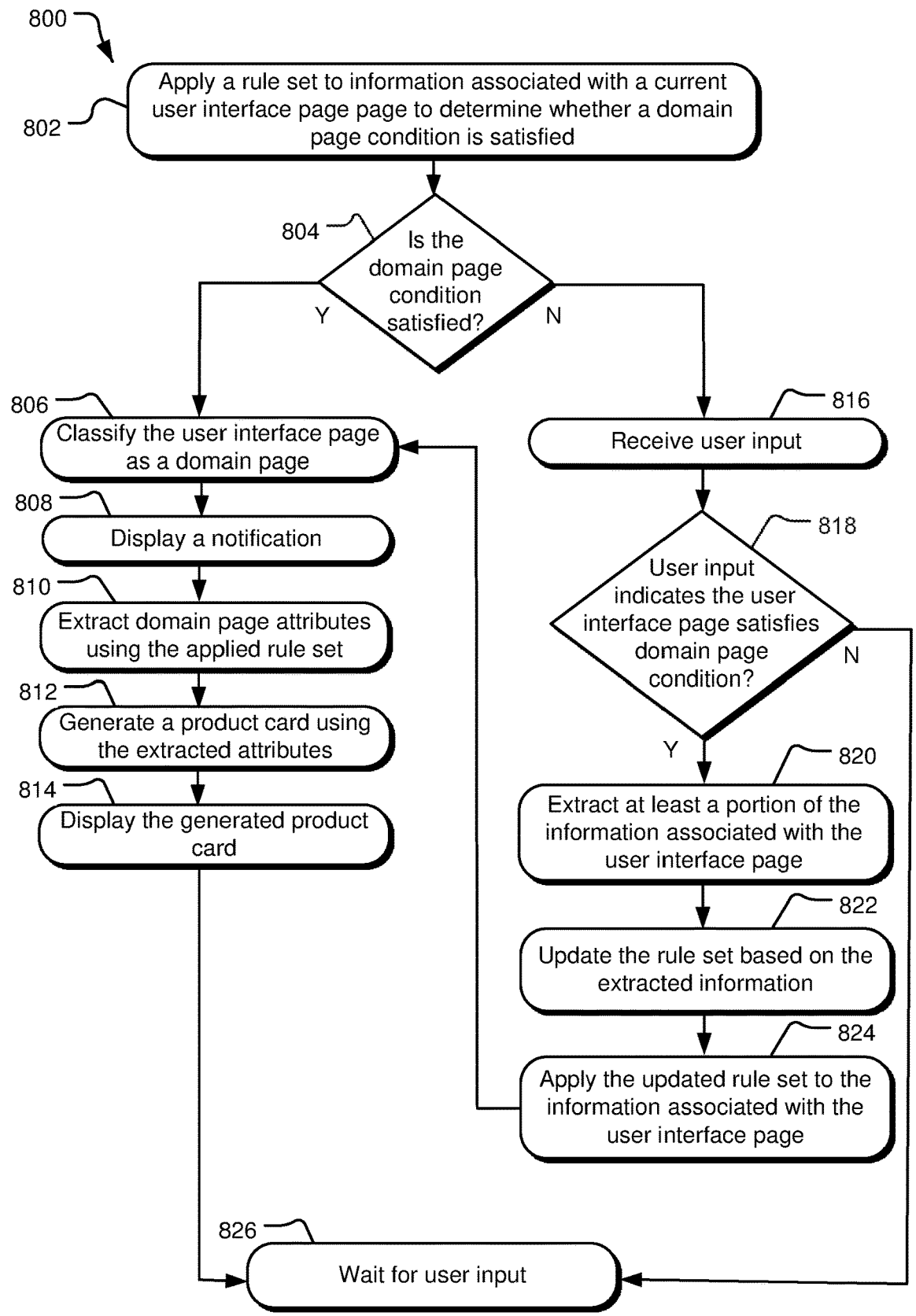
FIG. 8 illustrates example operations for training a user interface page classification system.

FIG. 8 illustrates example operations 800 for training a user interface page classification system. Specifically, FIG. 8 illustrates operations for training the user interface page classification system when the user does not need to identify specific attributes. The user interface page classification system may monitor user navigation between user interface pages and apply the operations 800 to each user interface page that the user visits (e.g., a current page). The user interface pages may be webpages, documents, application pages, images, etc. An applying operation 802 applies a rule set to information associated with a current user interface page to determine whether a domain page condition is satisfied. The information associated with the user interface page may be one or more HTML tags, CSS selectors, the DOM of the user interface page, a portion of the URL, etc. For example, if the URL is known to the rule set, then a specific subset of the rule set associated with the URL may be used to analyze the DOM of the user interface page to identify attributes. If the URL is unknown, then the rule set may be used to identify attributes (e.g., by using pattern matching or identifying CSS elements). A deciding operation 804 determines whether the domain page condition is satisfied. If the URL is associated with the known schema and the rule set identifies attributes, then the domain name condition is satisfied. Similarly, if the rule set is able to identify a threshold number of attributes, then the domain name condition is satisfied.

If the domain page condition is satisfied in the deciding operation 804, then a classifying operation 806 classifies the current page as a domain page. A displaying operation 808 displays a notification, which notifies the user that the current page has been classified as a domain page. An extracting operation 810 extracts domain page attributes using the applied rule set. Such attributes may include, a price of a product, name of a product, image of a product, etc. The rule set that was applied may be configured to extract these attributes (e.g., as they are identified). A generating operation 812 generates a product card using the extracted attributes. A displaying operation 814 displays the generated product card (e.g., in a personal shopping assistant window). If the user interface page classification system is being used in a context other than a personal shopping assistant, then different cards may be generated and different attributes extracted. For example, if the user is doing research, and the system is saving snippets for later use, a domain card may include the name of a visited article, the author, a summary, publication date, etc. The cards are automatically generated and saved by the system such that the user may easily find and reference the subject matter of the corresponding user interface pages. A waiting operation 826 waits for user input. Such user input may include navigation to another user interface page such that the operations 800 may be repeated.

If the domain page condition is determined to be not satisfied in the deciding operation 816, then the current page is not classified as a domain page and no notification is displayed in the displaying operation 808. Furthermore, no product card is generated in the generating operation 812. A receiving operation 816 receives user input. A second deciding operation 818 determines whether the received user input indicates that the user interface page satisfies a domain page condition (e.g., the user wants to train the user interface page classification system). For example, user may select a "Train PSA" option in a displayed menu. In this example, the received user input indicates that the user interface page satisfies the domain page condition. The process continues to an extracting operation 820 which extracts at least a portion of the information associated with the user interface page. The extracted information may be the schema or the information (code, script, CSS elements) that defines the schema and/or the relevant attributes in the schema. An updating operation updates the rule set based on the extracted information. The schema may be added to the rule set such that the user interface page classification system is able to classify, as a domain page, other user interface pages with the same or similar schema as the current user interface page. An applying operation 824 applies the updated rule set to the information associated with the user interface page.

The process then continues to the classifying operation 806, which classifies the user interface page as a domain page (e.g., the domain page condition is satisfied based on the received user input). The displaying operation 808 displays a notification indicating that the user interface page is now classified as a domain page. The extracting operation 810 extracts domain page attributes using the applied rule set (e.g., the updated rule set). It should be understood that the extracting operation 810 and the extracting operation 820 may happen simultaneously. For example, when extracting the information to update the rule set, the attributes may be extracted. The generating operation 812 generates the product card using the extracted attributes and the displaying operation displays the generated product card. The process continues to the waiting operation 826 that waits for user input (e.g., navigation to a new user interface page). In the deciding operation 818, if it is determined that the user input does not indicate that the user interface page satisfies the domain page condition, then the process continues to the waiting operation 826.

Figure 9:
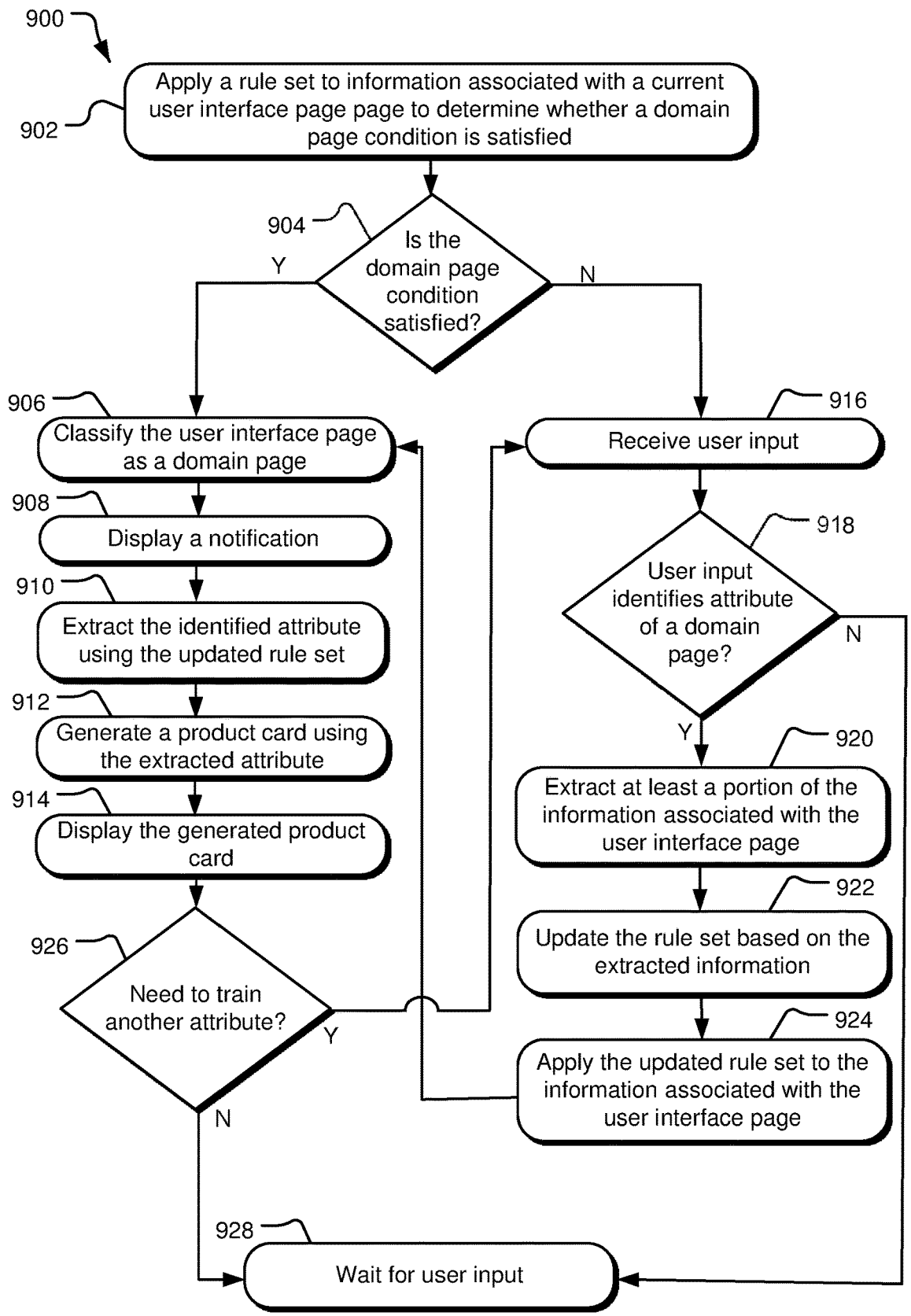
FIG. 9 illustrates alternative example operations for training a user interface page classification system.

FIG. 9 illustrates alternative example operations for training a user interface page classification system. Specifically, FIG. 9 illustrates operations for training the user interface page classification system when the user identifies a specific attribute to train the user interface page classification system, but the user interface page classification system is unable to identify other attributes (or incorrectly identifies attribute) of the domain page. The user interface page classification system may monitor user navigation between user interface pages and apply the operations 900 to each user interface page that the user visits (e.g., a current page). An applying operation 902 applies a rule set to information associated with the current user interface page to determine whether a domain page condition is satisfied. The information associated with the user interface page may be the document object model (DOM) of the user interface page, the URL associated with the user interface page, information designated by HTML tags, CSS selectors, etc. For example, if the URL of the user interface page is known to the rule set, then a specific subset of the rule set associated with the URL may be used to analyze the DOM of the user interface page to identify attributes. If the URL is unknown, then the rule set may be used to identify attributes (e.g., by using pattern matching or element identifying techniques). A deciding operation 904 determines whether the domain page condition is satisfied. If the URL is associated with the known schema and the rule set identifies attributes, then the domain name condition is satisfied. Similarly, if the rule set is able to identify a threshold number of attributes, then the domain name condition is satisfied.

If the domain page condition is satisfied in the deciding operation 904, then a classifying operation 906 classifies the current page as a domain page. A displaying operation 908 displays a notification, which notifies the user that the current page has been classified as a domain page. An extracting operation 910 extracts domain page attributes using the applied rule set. Such attributes may include, a price of a product, name of a product, image of a product, etc. The rule set that was applied may be configured to extract these attributes (e.g., as they are identified). A generating operation 912 generates a product card using the extracted attributes. A displaying operation 914 displays the generated product card (e.g., in a personal shopping assistant window). If the user interface page classification system is being used in a context other than a personal shopping assistant, then different cards may be generated and different attributes extracted. For example, if the user is doing research, and the system is saving snippets for later use, a domain card may include the name of a visited article, the author, a summary, publication date, etc. The cards are automatically generated and saved by the system such that the user may easily find and reference the subject matter of the corresponding user interface pages. A waiting operation 928 waits for user input. Such user input may include navigation to another user interface page such that the operations 900 may be repeated.

If the domain page condition is not satisfied in the deciding operation 904, then the user may train the user interface page classification system. The receiving operation 916 receives a user input. A second deciding operation 918 determines whether the user input identifies an attribute of a domain page (e.g., the user is training the user interface page classification system). If the user does not identify an attribute of the domain page, then the process proceed to the waiting operation 928. If the user input identifies an attribute of a domain page, then extracting operation 920 extracts at least a portion of the information associated with the user interface page. The extracted information may be a schema identified in the DOM of the user interface page, a portion of the schema (e.g., code/scripting language associated with the identified attribute), image information, HTML tag information, CSS selectors, etc. For example, the user interface page classification system traverses the DOM of the user interface page until it locates the CSS selector element associated with the attribute indicated by the user input. The user interface page classification system then extracts the CSS selector. An updating operation 922 updates the rule set based on the extracted information. An applying operation 924 applies the updated rule set to the information associated with the user interface page. Because the user identified an attribute of the domain page, the domain page condition is satisfied, and a classifying operation 906 classifies the user interface page as a domain page. The displaying operation 908 displays a notification, which notifies the user that the user interface page has been classified as a domain page. The extracting operation 910 extracts the identified attribute using the updated rule set. It should be understood that the information to update the rule set may be extracted at the same time the attributes are extracted for the product card. For example, the same or corresponding information (e.g., a CSS selector) may be used to update the rule set and used as the attribute. The generating operation 912 generates a product card using the extracted attribute. The displaying operation 914 displays the generated product card. A third deciding operation 926 determines whether the user interface page classification system needs to be trained to identify other attributes of the domain page (e.g., if attributes are missing from the product card or attributes are incorrectly identified).

If attributes are missing (or attributes are incorrectly identified) in the deciding operation 926, then receiving operation 916 receives user input. The deciding operation 918 decides whether the received user input identifies another attribute of the domain page. The process then continues to the extracting operation 920 or the waiting operation 928, as described above. The process continues until either all attributes (or a threshold number of attributes) are correctly identified, or the user takes other action. If attributes are not missing in the product card in the deciding operation 926 (e.g., all attributes or a threshold number of attributes are identified), then waiting operation 928 waits for user input.

Figure 10:
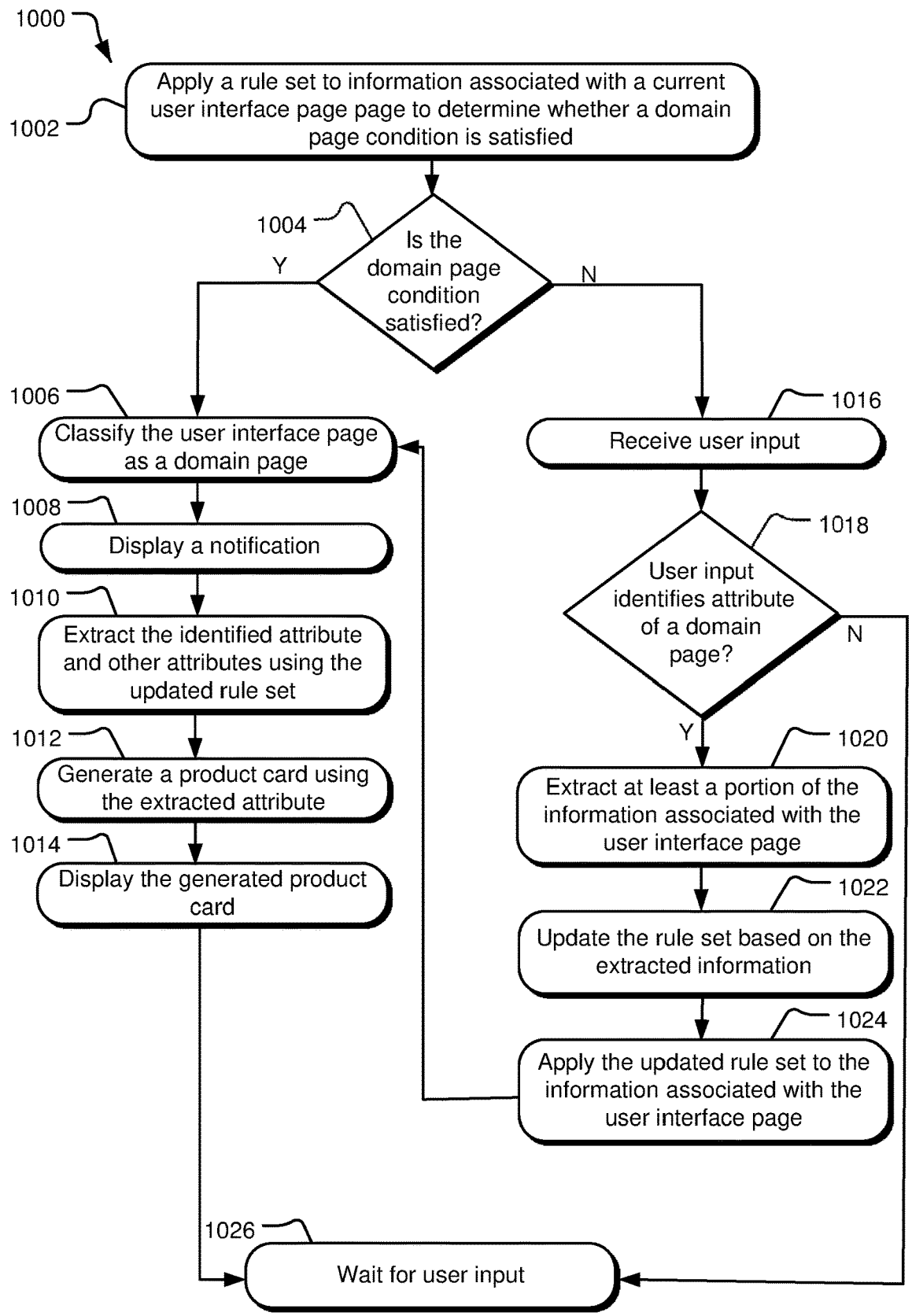
FIG. 10 illustrates alternative example operations for training a user interface page classification system.

FIG. 10 illustrates alternative example operations for training a user interface page classification system. Specifically, FIG. 10 illustrates operations training the user interface page classification system when the user does identify a specific attribute of the domain page, and the user interface page classification system is able to identify other attributes of the domain page (without additional user training). The user interface page classification system may monitor user navigation between user interface pages and apply the operations 1000 to each user interface page that the user visits (e.g., a current page). An applying operation 1002 applies a rule set to information associated with the current user interface page to determine whether a domain page condition is satisfied. The information associated with the user interface page may be the document object model (DOM) of the user interface page, the URL associated with the user interface page, information designated by HTML tags, etc. For example, if the URL is known to the rule set, then a specific subset of the rule set associated with the URL may be used to analyze the DOM of the user interface page to identify attributes. If the URL is unknown, then the rule set may be used to identify attributes (e.g., by using pattern matching or element identifying techniques). A deciding operation 1004 determines whether the domain page condition is satisfied. If the URL is associated with the known schema and the rule set identifies attributes, then the domain name condition is satisfied. Similarly, if the rule set is able to identify a threshold number of attributes, then the domain name condition is satisfied.

If the domain page condition is satisfied in the deciding operation 1004, then a classifying operation 1006 classifies the current page as a domain page. A displaying operation 1008 displays a notification, which notifies the user that the current page has been classified as a domain page. An extracting operation 1010 extracts domain page attributes using the applied rule set. Such attributes may include, a price of a product, name of a product, image of a product, etc. The rule set that was applied may be configured to extract these attributes (e.g., as they are identified). A generating operation 1012 generates a product card using the extracted attributes. A displaying operation 1014 displays the generated product card (e.g., in a personal shopping assistant window). If the user interface page classification system is being used in a context other than a personal shopping assistant, then different cards may be generated and different attributes extracted. For example, if the user is doing research, and the system is saving snippets for later use, a domain card may include the name of a visited article, the author, a summary, publication date, etc. The cards are automatically generated and saved by the system such that the user may easily find and reference the subject matter of the corresponding user interface pages. A waiting operation 1026 waits for user input. Such user input may include navigation to another user interface page such that the operations 1000 may be repeated.

If the domain page condition is not satisfied in the deciding operation 1004, then the user may elect to train the user interface page classification system. A receiving operation 1016 receives user input. A second deciding operation 1018 determines whether the user input identifies an attribute of a domain page. If the user input does not identify an attribute (e.g., the user navigates to another page), then the waiting operation 1026 waits for more user input. If it is determined that the user input identifies an attribute of a domain page in the deciding operation 1018, then an extracting operation 1020 extracts at least a portion of the information associated with the user interface page. The extracted information may be information designated by HTML tags, CSS selectors, URL, DOM, etc. For example, the user interface page classification system may traverse the DOM of the user interface page until it identifies the CSS selector associated with the selected attribute. In the illustrated implementation, after the selected attribute is identified, the user interface page classification system is able to identify additional attributes without subsequent user input (e.g., additional training). For example, the DOM is traversed and attributes (e.g., CSS selectors and/or HTML tags) are identified without additional user training for those attributes. As such, the additional attributes (or the CSS selectors defining the attributes) are extracted. An updating operation 1022 updates the rule set based on the extracted information. An applying operation applies the updated rule set of the information associated with the user interface page. The user interface page condition is satisfied, and the classifying operation 1006 classifies the user interface page as a domain page.

Figure 11:
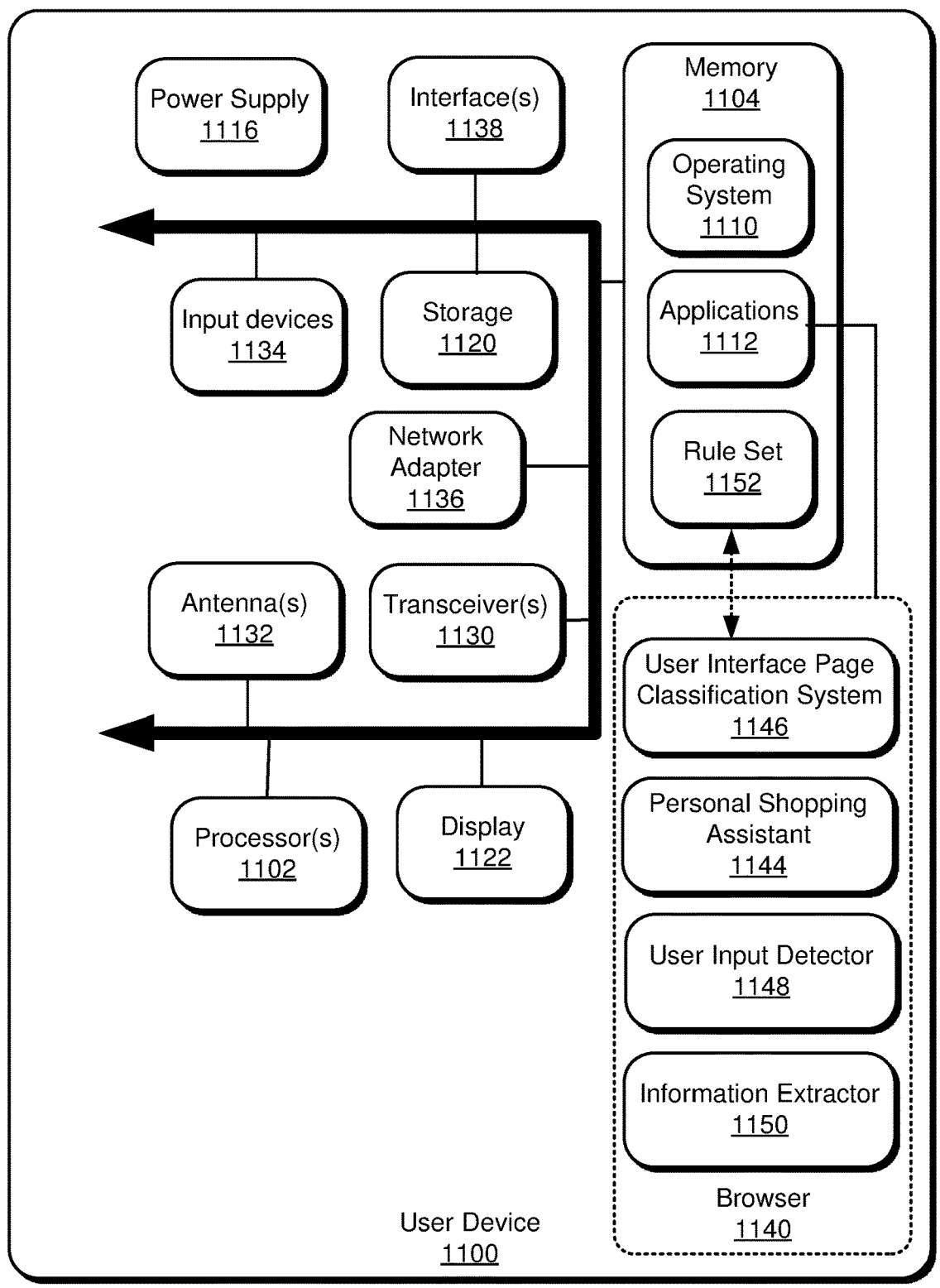
FIG. 11 illustrates an example system that may be useful in implementing the described technology.

FIG. 11 illustrates an example system (labeled as a user device 1100) that may be useful in implementing the described technology. The user device 1100 includes one or more processor(s) 1102, a memory 1104. The memory 1104 generally includes both volatile memory (e.g., RAM) and non-volatile memory (e.g., flash memory). An operating system 1110 resides in the memory 1104 and is executed by the processor 1102.

One or more application programs 1112 modules or segments, such as a browser 1140 are loaded in the memory 1104 and/or storage 1120 and executed by the processor 1102. The browser 1140 may include a user interface page classification system 1146, a personal shopping assistant 1144, a user input detector 1148, an information extractor 1150, which may be embodied in instructions stored in the memory 1104 and/or storage 1120 and executed by the processor 1102. The user input detector 1148 and the information extractor 1150 may be part of the user interface page classification system 1146, which may be associated with the personal shopping assistant 1144 or another application, such as a research assistant application. Furthermore, the user interface page classification system 1146, personal shopping assistant 1144, the user input detector 1148, and the information extractor may be an add on or extension to the browser 1140. In other implementations, the user interface page classification system 1146, the personal shopping assistant 1144, the user input detector 1148, and the information extractor 1150 are separate stand-alone application (s) from the browser 1140. Data such as a rule set 1152, URL index, and associated domain page schema information, domain attributes and information, product card information, browser history, document object models (DOMs) of user interface pages, HTML tag identifiers, image schemas, images, etc. may be stored in the memory 1104 or storage 1120 and may be retrievable by the processor 1102 for use in the user interface page classification system 1146, the user input detector 1148, the information extractor 1150, the browser 1140, and/or the personal shopping assistant 1144. The storage 1120 may be local to the user device 1100 or may be remote and communicatively connected to the user device 1100 and may include another server. The storage 1120 may store resources that are requestable by client devices (not shown).

The user device 1100 includes a power supply 1116, which is powered by one or more batteries or other power sources and which provides power to other components of the user device 1100. The power supply 1116 may also be connected to an external power source that overrides or recharges the built-in batteries or other power sources.

The user device 1100 may include one or more communication transceivers 1130 which may be connected to one or more antenna(s) 1132 to provide network connectivity (e.g., mobile phone network, Wi-Fi®, Bluetooth®, etc.) to one or more other servers and/or client devices (e.g., mobile devices, desktop computers, or laptop computers). The user device 1100 may further include a network adapter 1136, which is a type of communication device. The user device 1100 may use the adapter and any other types of communication devices for establishing connections over a wide-area network (WAN) or local-area network (LAN). It should be appreciated that the network connections shown are exemplary and that other communications devices and means for establishing a communications link between the user device 1100 and other devices may be used.

The user device 1100 may include one or more input devices 1134 such that a user may enter commands and information (e.g., a keyboard or mouse). These and other input devices may be coupled to the server by one or more interfaces 1138 such as a serial port interface, parallel port, universal serial bus (USB), etc. The user device 1100 may further include a display 1122 such as a touch screen display.

The user device 1100 may include a variety of tangible computer-readable storage media and intangible computer-readable communication signals. Tangible computer-readable storage can be embodied by any available media that can be accessed by the user device 1100 and includes both volatile and nonvolatile storage media, removable and non-removable storage media. Tangible computer-readable storage media excludes intangible communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the user device 1100. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

An example user interface page classification system includes a user input detector configured to receive a user input that indicates that a user interface page satisfies a domain page condition. The example user interface page classification system further includes a domain page classifier configured to apply a rule set to information associated with a user interface page to determine that the user interface page does not satisfy a domain page condition. The domain page classifier is further configured to update the rule set based on at least a portion of the information associated with the user interface page. The domain page classifier is further configured to apply the updated rule set to the information associated with the user interface page to determine that the domain page condition is satisfied the user interface page and classify the user interface page as a domain page responsive to the domain page condition being satisfied.

Another example user interface page classification system of any preceding user interface page classification system includes an information extractor configured to extract one or more attributes from the information associated with the user interface page responsive to the received user input. The extracted attributes are used to generate a domain card to display on a user interface.

Another example user interface page classification system of any preceding user interface page classification system includes the user interface page being a product page. The user interface page classification system further includes an information extractor configured to extract one or more attributes of the product from the product page, the one or more attributes of the product being at least one of a name of the product, a price of the product, and an image depicting the product.

Another example user interface page classification system of any preceding user interface page classification system includes the user input detector being further configured to detect a location of the received user input, the detected location being used to identify one or more attributes of the domain page.

An example method for training a user interface page classification system includes applying a rule set to information associated with a user interface page to determine that the user interface page does not satisfy a domain page condition, receiving a user input indicating that the user interface page satisfies the domain page condition, updating the rule set based on at least a portion of the information associated with the user interface page, applying the updated rule set to the information associated with the user interface page to determine that the domain page condition is satisfied by the user interface page, and classifying the user interface page as a domain page responsive to the domain page condition being satisfied.

Another example method of any preceding method includes the updated rule set being used to determine that a second user interface page satisfies the domain page condition.

Another example method of any preceding method includes extracting, using the updated rule set, one or more attributes from the information associated with the user interface page responsive to the received user input, the extracted attributes being used to generate a domain card to display on a user interface.

Another example method of any preceding method includes the user input being received at a detected location on the user interface page. The detected location is used to identify one or more attributes of the domain page.

Another example method of any preceding method includes the information associated with the user interface page being at least one of a URL, one or more HTML tags, and one or more CSS selectors.

Another example method of any preceding method includes the user interface page being a product page, and the method further includes applying the updated rule set to identify one or more attributes of the product. The one or more attributes of the product are at least one of a name of the product, a price of the product, and an image depicting the product.

Another example method of any preceding method includes the user interface page being a product page, and the method further includes applying the updated rule set to identify one or more attributes of the product. The one or more attributes of the product are at least one of a name of the product, a price of the product, and an image depicting the product. The method further includes generating a product card corresponding to the product using the one or more attributes and displaying the product card on a user interface.

Another example method of any preceding method includes the user interface page being an image of a product. The rule set applies image analysis rules to identify one or more attributes of the product.

A tangible processor-readable storage media embodied with instructions for executing on one or more processors and circuits of a device a process for training a user interface page classification system includes applying a rule set to information associated with a user interface page to determine that the user interface page does not satisfy a domain page condition, receiving a user input indicating that the user interface page satisfies the domain page condition, updating the rule set based on at least a portion of the information associated with the user interface page, applying the updated rule set to the information associated with the user interface page to determine that the domain page condition is satisfied by the user interface page, and classifying the user interface page as a domain page responsive to the domain page condition being satisfied.

Another example tangible processor-readable storage media of any preceding tangible processor-readable storage media includes the updated rule set being used to determine that a second user interface page satisfies the domain page condition.

Another example tangible processor-readable storage media of any preceding tangible processor-readable storage media includes extracting, using the updated rule set, one or more attributes from the information associated with the user interface page responsive to the received user input, the extracted attributes being used to generate a domain card to display on a user interface.

Another example tangible processor-readable storage media of any preceding tangible processor-readable storage media includes the user input being received at a detected location on the user interface page. The detected location is used to identify one or more attributes of the domain page.

Another example tangible processor-readable storage media of any preceding tangible processor-readable storage media includes the information associated with the user interface page being at least one of a URL, one or more HTML tags, and one or more CSS selectors.

Another example tangible processor-readable storage media of any preceding tangible processor-readable storage media includes the user interface page being a product page, and the process further includes applying the updated rule set to identify one or more attributes of the product. The one or more attributes of the product are at least one of a name of the product, a price of the product, and an image depicting the product.

Another example tangible processor-readable storage media of any preceding tangible processor-readable storage media includes the user interface page being a product page, and the method further includes applying the updated rule set to identify one or more attributes of the product. The one or more attributes of the product are at least one of a name of the product, a price of the product, and an image depicting the product. The process further includes generating a product card corresponding to the product using the one or more attributes and displaying the product card on a user interface.

Another example tangible processor-readable storage media of any preceding tangible processor-readable storage media includes the user interface page being an image of a product. The rule set applies image analysis rules to identify one or more attributes of the product.

An example system for training a user interface page classification system includes means for applying a rule set to information associated with a user interface page to determine that the user interface page does not satisfy a domain page condition; receiving a user input indicating that the user interface page satisfies the domain page condition; updating the rule set based on at least a portion of the information associated with the user interface page; applying the updated rule set to the information associated with the user interface page to determine that the domain page condition is satisfied by the user interface page; and classifying the user interface page as a domain page responsive to the domain page condition being satisfied.

Another example system of any preceding system is configured such that the updated rule set is used to determine that a second user interface page satisfies the domain page condition.

Another example system of any preceding system includes means for extracting, using the updated rule set, one or more attributes from the information associated with the user interface page responsive to the received user input, the extracted attributes being used to generate a domain card to display on a user interface.

Another example system of any preceding system is configured such that the user input is received at a detected location on the user interface page, the detected location used to identify one or more attributes of the domain page.

Another example system of any preceding system is configured such that the information associated with the user interface page is at least one of a URL, one or more HTML tags, and one or more CSS selectors.

Another example system of any preceding system is configured such that the user interface page is a product page. The system further includes means for applying the updated rule set to identify one or more attributes of the product, the one or more attributes of the product being at least one of a name of the product, a price of the product, and an image depicting the product.

Another example system of any preceding system is configured such that the use interface page is a product page. The system includes means for applying the updated rule set to identify one or more attributes of the product, the one or more attributes of the product being at least one of a name of the product, a price of the product, and an image depicting the product; generating a product card corresponding to the product using the one or more attributes; and displaying the product card on a user interface.

Another example system of any preceding system is configured such that the user interface page is an image of a product. The rule set applies image analysis rules to the image to identify one or more attributes of the product.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A user interface page classification system comprising:
one or more hardware processors;
a user input detector executable by the one or more hardware processors and configured to receive a user input to reclassify the user interface page as a recognized domain page; and
a domain page classifier executable by the one or more hardware processors and configured to
apply a rule set to information associated with a user interface page to determine that the user interface page does not satisfy a domain page condition as a recognized domain page according to the rule set,
update the rule set based on at least a portion of the information associated with the user interface page, responsive to applying the rule set and receiving the user input,
apply the updated rule set to the information associated with the user interface page to determine that the domain page condition is satisfied by the user interface page, and
classify the user interface page as a recognized domain page responsive to the domain page condition being satisfied, responsive to applying the updated rule set.

2. The user interface page classification system of claim 1 further comprising:
an information extractor executable by the one or more hardware processors and configured to extract one or more attributes from the information associated with the user interface page responsive to the received user input, the extracted attributes being used to generate a domain card to display on a user interface.

3. The user interface page classification system of claim 1 wherein the user interface page is a product page for a product, the system further comprises:
an information extractor configured to extract one or more attributes of the product from the product page, the one or more attributes of the product being at least one of a name of the product, a price of the product, and an image depicting the product.

4. The user interface page classification system of claim 1 wherein the user input detector is further configured to detect a location on the user interface page of the received user input, the detected location being used to identify one or more attributes of the domain page.

5. A method for training a user interface page classification system, the method comprising:
applying a rule set to information associated with a user interface page to determine that the user interface page does not satisfy a domain page condition as a recognized domain page according to the rule set;
receiving a user input to reclassify the user interface page as a recognized domain page;
updating the rule set based on at least a portion of the information associated with the user interface page, responsive to applying the rule set and receiving the user input;
applying the updated rule set to the information associated with the user interface page to determine that the domain page condition is satisfied by the user interface page; and
classifying the user interface page as a recognized domain page responsive to the domain page condition being satisfied, responsive to applying the updated rule set.

6. The method of claim 5 wherein the updated rule set is used to determine that a second user interface page satisfies the domain page condition.

7. The method of claim 5 further comprising:
extracting, using the updated rule set, one or more attributes from the information associated with the user interface page responsive to the received user input, the extracted attributes being used to generate a domain card to display on a user interface.

8. The method of claim 5 wherein the user input is received at a detected location on the user interface page, the detected location used to identify one or more attributes of the domain page.

9. The method of claim 5 wherein the information associated with the user interface page is at least one of a URL, one or more HTML tags, and one or more CSS selectors.

10. The method of claim 5 wherein the user interface page is a product page for a product, the method further comprising:
applying the updated rule set to identify one or more attributes of the product, the one or more attributes of the product being at least one of a name of the product, a price of the product, and an image depicting the product.

11. The method of claim 5 wherein the user interface page is a product page, the method further comprising:
applying the updated rule set to identify one or more attributes of the product, the one or more attributes of the product being at least one of a name of the product, a price of the product, and an image depicting the product;
generating a product card corresponding to the product using the one or more attributes; and
displaying the product card on a user interface.

12. The method of claim 5 wherein the user interface page is an image of a product, the rule set applying image analysis rules to the image to identify one or more attributes of the product.

13. One or more tangible processor-readable storage media embodied with instructions for executing on one or more processors and circuits of a device a process for training a user interface page classification system, the process comprising:
applying a rule set to information associated with a user interface page to determine that the user interface page does not satisfy a domain page condition as a recognized domain page according to the rule set;

receiving a user input to reclassify the user interface page as a recognized domain page;

updating the rule set based on at least a portion of the information associated with the user interface page, responsive to applying the rule set and receiving the user input;

applying the updated rule set to the information associated with the user interface page to determine that the domain page condition is satisfied by the user interface page; and classifying the user interface page as a recognized domain page responsive to the domain page condition being satisfied, responsive to applying the updated rule set.

14. The one or more tangible processor-readable storage media of claim 13 wherein the updated rule set is used to determine that a second user interface page satisfies the domain page condition.

15. The one or more tangible processor-readable storage media of claim 13, the process further comprises:

extracting, using the updated rule set, one or more attributes from the information associated with the user interface page responsive to the received user input, the extracted attributes being used to generate a domain card to display on a user interface.

16. The one or more tangible processor-readable storage media of claim 13 wherein the user input is received at a detected location on the user interface page, the detected location used to identify one or more attributes of the domain page.

17. The one or more tangible processor-readable storage media of claim 13 wherein the information associated with the user interface page is at least one of a URL, one or more HTML tags, and one or more CSS selectors.

18. The one or more tangible processor-readable storage media of claim 13 wherein the user interface page is a product page and the process further comprises:

applying the updated rule set to identify one or more attributes of the product, the one or more attributes of the product being at least one of a name of the product, a price of the product, and an image depicting the product.

19. The one or more tangible processor-readable storage media of claim 13 wherein the user interface page is a product page, and the process further comprises:

applying the updated rule set to the information associated with the user interface page to identify one or more attributes of the product, the one or more attributes of the product being at least one of a name of the product, a price of the product, and an image depicting the product;

generating a product card corresponding to the product using the one or more attributes; and displaying the product card on a user interface.

20. The one or more tangible processor-readable storage media of claim 13 wherein the user interface page is an image of a product, the rule set applying image analysis rules to the image to identify one or more attributes of the product.

* * * * *